United States Patent
Stolte et al.

(10) Patent No.: US 9,092,467 B2
(45) Date of Patent: *Jul. 28, 2015

(54) SYSTEMS AND METHODS FOR DISPLAYING DATA IN SPLIT DIMENSION LEVELS

(71) Applicant: The Board of Trustees of the Leland Stanford Junior University, Palo Alto, CA (US)

(72) Inventors: Chris Stolte, Palo Alto, CA (US); Patrick Hanrahan, Portola Valley, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/753,452

(22) Filed: Jan. 29, 2013

(65) Prior Publication Data
US 2013/0246484 A1 Sep. 19, 2013

Related U.S. Application Data

(63) Continuation of application No. 12/821,029, filed on Jun. 22, 2010, now Pat. No. 8,364,724, which is a continuation of application No. 10/667,194, filed on Sep. 16, 2003, now Pat. No. 7,756,907.

(51) Int. Cl.
*G06F 17/30* (2006.01)

(52) U.S. Cl.
CPC .... *G06F 17/30292* (2013.01); *G06F 17/30554* (2013.01); *G06F 17/30572* (2013.01); *G06F 17/30592* (2013.01)

(58) Field of Classification Search
CPC .................................. G06F 17/30292
USPC ........... 707/805, 808, 999.006, 999.101, 797, 707/798, 999.007; 715/700; 345/440
See application file for complete search history.

(56) References Cited

U.S. PATENT DOCUMENTS 4,800,810 A 1/1989 Masumoto
5,036,314 A 7/1991 Barillari et al.
(Continued)

FOREIGN PATENT DOCUMENTS

HU 215657 B 1/1994
WO WO 2006/060773 A2 6/2006

OTHER PUBLICATIONS

Becker, Trellis Graphics Displays: A Multi-Dimensional Data Visualization Tool for Data Mining, Third Annual Conference on Knowledge Discovery in Databases, Aug. 1997, 13 pgs.
(Continued)

*Primary Examiner* — Marc Filipczyk
(74) *Attorney, Agent, or Firm* — Morgan, Lewis & Bockius LLP

(57) ABSTRACT

Systems and methods for displaying data in split dimension levels are disclosed. In some implementations, a method includes: at a computer, obtaining a dimensional hierarchy associated with a dataset, wherein the dimensional hierarchy includes at least one dimension and a sub-dimension of the at least one dimension; and populating information representing data included in the dataset into a visual table having a first axis and a second axis, wherein the first axis corresponds to the at least one dimension and the second axis corresponds to the sub-dimension of the at least one dimension.

18 Claims, 25 Drawing Sheets

(56) References Cited

U.S. PATENT DOCUMENTS

| | | | |
|---|---|---|---|
| 5,060,980 A | 10/1991 | Johnson et al. | |
| 5,143,888 A | 9/1992 | Olbrich | |
| 5,144,452 A | 9/1992 | Abuyama | |
| 5,169,713 A | 12/1992 | Kumurdjian | |
| 5,265,244 A | 11/1993 | Ghosh et al. | |
| 5,265,246 A | 11/1993 | Li et al. | |
| 5,377,348 A | 12/1994 | Lau et al. | |
| 5,383,029 A | 1/1995 | Kojima | |
| 5,461,708 A | 10/1995 | Kahn | |
| 5,560,007 A | 9/1996 | Thai | |
| 5,577,241 A | 11/1996 | Spencer | |
| 5,581,677 A | 12/1996 | Myers et al. | |
| 5,664,172 A | 9/1997 | Antoshenkov | |
| 5,664,182 A | 9/1997 | Nierenberg et al. | |
| 5,668,987 A | 9/1997 | Schneider | |
| 5,794,246 A | 8/1998 | Sankaran et al. | |
| 5,864,856 A | 1/1999 | Young | |
| 5,893,088 A | 4/1999 | Hendricks et al. | |
| 5,933,830 A | 8/1999 | Williams | |
| 6,031,632 A | 2/2000 | Yoshihara et al. | |
| 6,032,158 A | 2/2000 | Mukhopadhyay et al. | |
| 6,044,374 A | 3/2000 | Nesamoney et al. | |
| 6,100,901 A | 8/2000 | Mohda et al. | |
| 6,115,744 A | 9/2000 | Robins et al. | |
| 6,154,766 A | 11/2000 | Yost et al. | |
| 6,173,310 B1 | 1/2001 | Yost et al. | |
| 6,188,403 B1 | 2/2001 | Sacerdoti et al. | |
| 6,208,990 B1 | 3/2001 | Suresh et al. | |
| 6,222,540 B1 | 4/2001 | Sacerdoti et al. | |
| 6,247,008 B1 | 6/2001 | Cambot et al. | |
| 6,253,257 B1 | 6/2001 | Dundon | |
| 6,260,050 B1 | 7/2001 | Yost et al. | |
| 6,269,393 B1 | 7/2001 | Yost et al. | |
| 6,300,957 B1 | 10/2001 | Rao et al. | |
| 6,301,579 B1 | 10/2001 | Becker | |
| 6,317,750 B1 | 11/2001 | Tortolani et al. | |
| 6,327,628 B1 | 12/2001 | Anuff et al. | |
| 6,339,775 B1 | 1/2002 | Zamanian et al. | |
| 6,377,259 B1 | 4/2002 | Tenev et al. | |
| 6,397,195 B1 | 5/2002 | Pinard et al. | |
| 6,397,204 B1 * | 5/2002 | Liu et al. | 1/1 |
| 6,400,366 B1 | 6/2002 | Davies et al. | |
| 6,405,195 B1 | 6/2002 | Ahlberg | |
| 6,405,208 B1 | 6/2002 | Raghavan et al. | |
| 6,424,933 B1 | 7/2002 | Agrawala et al. | |
| 6,490,593 B2 | 12/2002 | Proctor | |
| 6,492,989 B1 | 12/2002 | Wilkinson | |
| 6,505,205 B1 | 1/2003 | Kothuri et al. | |
| 6,522,342 B1 | 2/2003 | Gagnon et al. | |
| 6,529,217 B1 | 3/2003 | Maguire, III et al. | |
| 6,581,068 B1 * | 6/2003 | Bensoussan et al. | 1/1 |
| 6,611,825 B1 | 8/2003 | Billheimer et al. | |
| 6,643,646 B2 | 11/2003 | Su et al. | |
| 6,707,454 B1 * | 3/2004 | Barg et al. | 345/440 |
| 6,714,897 B2 | 3/2004 | Whitney et al. | |
| 6,725,230 B2 | 4/2004 | Ruth et al. | |
| 6,750,864 B1 | 6/2004 | Anwar | |
| 6,768,986 B2 | 7/2004 | Cras et al. | |
| 6,906,717 B2 | 6/2005 | Couckuyt et al. | |
| 7,009,609 B2 | 3/2006 | Miyadai | |
| 7,089,266 B2 | 8/2006 | Stolte et al. | |
| 7,117,058 B2 | 10/2006 | Lin et al. | |
| 7,181,450 B2 * | 2/2007 | Malloy et al. | 1/1 |
| 7,315,305 B2 | 1/2008 | Crotty et al. | |
| 7,379,601 B2 | 5/2008 | Yang et al. | |
| 7,756,907 B2 | 7/2010 | Stolte et al. | |
| 2002/0016699 A1 | 2/2002 | Hoggart et al. | |
| 2002/0118192 A1 | 8/2002 | Couckuyt et al. | |
| 2002/0123865 A1 | 9/2002 | Whitney et al. | |
| 2002/0154118 A1 | 10/2002 | McCarthy et al. | |
| 2003/0042928 A1 | 3/2003 | Tsai | |
| 2003/0200034 A1 | 10/2003 | Fellenberg et al. | |
| 2004/0183800 A1 | 9/2004 | Peterson | |
| 2004/0227759 A1 | 11/2004 | McKnight et al. | |
| 2004/0243593 A1 | 12/2004 | Stolte et al. | |
| 2005/0035966 A1 | 2/2005 | Pasquarette et al. | |
| 2005/0035967 A1 | 2/2005 | Joffrain et al. | |
| 2005/0060300 A1 | 3/2005 | Stolte et al. | |
| 2005/0099423 A1 | 5/2005 | Brauss | |
| 2006/0129913 A1 | 6/2006 | Vigesaa et al. | |
| 2006/0136825 A1 | 6/2006 | Cory et al. | |
| 2006/0206512 A1 | 9/2006 | Hanrahan et al. | |
| 2007/0061344 A1 | 3/2007 | Dickerman et al. | |

OTHER PUBLICATIONS

Becker, Visualizing Decision Table Classifiers, Proceedings IEEE Symposium on Information Visualization, 1998, pp. 102-105.

Beers, Notice of Allowance, U.S. Appl. No. 11/787,761, Apr. 8, 2011, 8 pgs.

Beers, Office Action, U.S. Appl. No. 11/787,761, Dec. 1, 2010, 16 pgs.

Beers, Office Action, U.S. Appl. No. 11/787,761, Jul. 8, 2009, 14 pgs.

Beers, Office Action, U.S. Appl. No. 11/787,761, Jun. 12, 2008, 12 pgs.

Beers, Office Action, U.S. Appl. No. 11/787,761, Sep. 14, 2010, 12 pgs.

Beers, Office Action, U.S. Appl. No. 11/787,761, Dec. 17, 2008, 13 pgs.

Beers, Office Action, U.S. Appl. No. 11/787,761, Apr. 28, 2010, 10 pgs.

Beers, Office Action, U.S. Appl. No. 11/787,761, Nov. 30, 2009, 14 pgs.

Bosch, Performance Analysis and Visualization of Parallel Systems Using SimOS and Rivet: A Case Study, Proceedings of the Sixth IEEE International Symposium on High-Performance Computer Architecture, Jan. 2000, 13 pgs.

Bosch, Rivet: A Flexible Environment for Computer Systems Visualization, Computer Graphics 34, Feb. 2000, 9 pgs.

Brunk, MineSet: An Integrated System for Data Mining, Proceeding of the 3rd International Conference on Knowledge Discovery and Data Mining, AAA1 Press, 1997, 4 pgs.

Derthick, An Interactive Visual Query Environment for Exploring Data, Proceedings of ACM SIGGRAPH Symposium on User Interface Software & Technology, 1997, 11 pgs.

Freeze, Unlocking OLAP with Microsoft SQL Server and Excel 2000, IDG Books Worldwide, Foster City, CA, 2000, pp. 155-332 and 379-422.

Fua, Navigating Hierarchies with Structure-Based Brushes, Proc. of Infovis '99 (San Francisco, CA, USA), IEEE Computer Soc Press, 1999, 7 pgs.

Goldstein, A Framework for Knowledge-Based Interactive Data Exploration, Journal of Visual Languages and Computing 5, Dec. 1994, 30 pgs.

Gray, Data Cube: A Relational Aggregation Operator Generalizing Group-By, Cross-Tab, and Sub-Total, Data Mining and Knowledge Discovery 1, 1997, pp. 29-53.

Hanrahan, Notice of Allowance, U.S. Appl. No. 11/005,652, May 18, 2010, 4 pgs.

Hanrahan, Office Action, U.S. Appl. No. 11/005,652, Feb. 20, 2009, 11 pgs.

Hanrahan, Office Action, U.S. Appl. No. 11/005,652, Oct. 23, 2009, 14 pgs.

Hanrahan, Office Action, U.S. Appl. No. 11/005,652, Jul. 24, 2008, 11 pgs.

Hanrahan, Office Action, U.S. Appl. No. 11/005,652, Dec. 27, 2007, 11 pgs.

Hanrahan, Specification, U.S. Appl. No. 11/005,652, Dec. 2, 2004, 104 pgs.

Healey, On the Use of Perceptual Cues and Data Mining for Effective Visualization of Scientific Datasets, Proceedings Graphics Interface '98, 1998, 8 pgs.

Kohavi, Data Mining and Visualization, Frontiers of Engineering: Reports of leading-Edge Engineering from the 200 NAE Sym., 2000, 8 pgs.

Livny, DEVise: Integrated Querying and Visual Exploration of Large Datasets, Proceedings of ACM SIGMOD, May 1997, 12 pgs.

MacDonald, Creating Basic Charts, Excel 2003, Chapter 9, 2006, two cover sheets and pp. 298-342.

(56) References Cited

OTHER PUBLICATIONS

Mackinlay, Automating the Design of Graphical Presentations of Relational Information, ACM Transactions on Graphics 5(2), 1986, 34 pgs.
Mackinlay, Office Action, U.S. Appl. No. 11/223,658, Jun. 10, 2010, 22 pgs.
Mackinlay, Office Action, U.S. Appl. No. 11/223,658, Nov. 12, 2009, 22 pgs.
Mackinlay, Office Action, U.S. Appl. No. 11/223,658, May 21, 2008, 20 pgs.
Mackinlay, Office Action, U.S. Appl. No. 11/223,658, Jan. 21, 2011, 22 pgs.
Mackinlay, Office Action, U.S. Appl. No. 11/223,658, Feb. 23, 2009, 19 pgs.
Mackinlay, Specification, U.S. Appl. No. 11/223,658, Sep. 5, 2005, 58 pgs.
Magyar Szabadalmi Hivatal, Hungarian Search Report, Hungarian Patent Application P0700460, Oct. 9, 2007, 1 pg.
Perlin, An Alternative Approach to the Computer Interface, Proc. of the 20$^{th}$ International Conference on Computer Graphics and Interactive Techniques, 1993, 11 pgs.
Rao, The Table Lens: Merging Graphical and Symbolic Representations in an Interactive Focus+Context Visualization for Tabular Information, Proc. of ACM SIGCHI, Apr. 1994, 7 pgs.
Roth, Interactive Graphics Design Using Automatic Presentation Knowledge, Proceedings of the Conference on Human Factors in Computer Systems, Proc. SIGCHI '94, Apr. 24-28, 1994, 7 pgs.
Roth, Visage: A User Interface Environment for Exploring Information Proceedings of Information Visualization Symposium 1996, Oct. 28-29, 2006, 9 pgs.
Screen Dumps for Microsoft Office Excel 2003 SP2, figures 1-36, 2003, 19 pgs.
Spenke, Focus: The Interactive Table for Product Comparison and Selection, Proc. of ACM Symposium on User Interface Software and Technology, Nov. 1996, 10 pgs.
Stevens, On the Theory of Scales of Measurement, Science vol. 103, No. 2684, Jun. 7, 1946, pp. 677-680.
Stolte, Multiscale Visualization Using Data Cubes, Proceedings of the Eighth IEEE Symposium on Information Visualization, 2002, 8 pgs.
Stolte, Notice of Allowance, U.S. Appl. No. 10/453,834, Mar. 27, 2006, 3 pgs.
Stolte, Notice of Allowance, U.S. Appl. No. 10/667,194, Mar. 5, 2010, 4 pgs.
Stolte, Notice of Allowance, U.S. Appl. No. 11/488,407, Dec. 29, 2009, 8 pgs.
Stolte, Notice of Allowance, U.S. Appl. No. 12/821,029, Sep. 24, 2012, 8 pgs.
Stolte, Office Action, U.S. Appl. No. 10/667,194, Jan. 7, 2008, 9 pgs.
Stolte, Office Action, U.S. Appl. No. 10/667,194, Feb. 9, 2009, 11 pgs.
Stolte, Office Action, U.S. Appl. No. 10/667,194, Aug. 14, 2007, 16 pgs.
Stolte, Office Action, U.S. Appl. No. 10/667,194, Aug. 14, 2008, 10 pgs.
Stolte, Office Action, U.S. Appl. No. 10/667,194, Jan. 18, 2007, 15 pgs.
Stolte, Office Action, U.S. Appl. No. 10/667,194, Sep. 25, 2009, 10 pgs.
Stolte, Office Action, U.S. Appl. No. 10/667,194, Jun. 26, 2006, 13 pgs.
Stolte, Office Action, U.S. Appl. No. 11/488,407, Apr. 3, 2009, 6 pgs.
Stolte, Office Action, U.S. Appl. No. 12/821,029, Apr. 12, 2011, 9 pgs.
Stolte, Office Action, U.S. Appl. No. 12/821,029, Feb. 24, 2012, 10 pgs.
Stolte, Polaris: A System for Query, Analysis, and Visualization of Multidimensional Relational Databases, IEEE Transactions on Visualization and Computer Graphics 8(1), Jan. 2002, pp. 52-65.
Stolte, Query, Analysis, and Visualization of Hierarchically Structured Data Using Polaris, Proc. of the Eight ACM SIGKDD '02, International Conference on Knowledge Discovery and Data Mining, Jul. 2002, 11 pgs.
Stolte, Specification, U.S. Appl. No. 10/453,834, Jun. 2, 2003, 114 pgs.
Stolte, Visualizing Application Behavior on Superscalar Processors, Proceedings of the IEEE Symposium on Information Visualization, 1999, 9 pgs.
Tableau Software Inc., International Preliminary Report on Patentability, PCT/US2007/009810, Oct. 22, 2008, 7 pgs.
Tableau Software Inc., International Search Report and Written Opinion, PCT/US2007/009810, Jul. 7, 2008, 8 pgs.
Tableau Software LLC, International Preliminary Report on Patentability, PCT/US2005/043937, Jun. 5, 2007, 9 pgs.
Tableau Software LLC, International Preliminary Report on Patentability, PCT/US2006/035300, Mar. 24, 2009, 5 pgs.
Tableau Software LLC, International Search Report and Written Opinion, PCT/US2005/043937, Apr. 18, 2007, 9 pgs.
Tableau Software LLC, International Search Report and Written Opinion, PCT/US2006/035300, Jul. 7, 2008, 6 pgs.
The Board of Trustees of the Leland Stanford Jr. University, International Preliminary Report on Patentability, PCT/US04/18217, Oct. 19, 2006, 4 pgs.
The Board of Trustees of the Leland Stanford Jr. University, International Search Report and Written Opinion, PCT/US04/18217, Feb. 7, 2006, 6 pgs.
The Board of Trustees of the Leland Stanford Jr. University, International Preliminary Report on Patentability, PCT/US04/30396, Apr. 9, 2007, 5 pgs.
The Board of Trustees of the Leland Stanford Jr. University, International Search Report and Written Opinion, PCT/US04/30396, Aug. 24, 2006, 5 pgs.
The Board of Trustees of the Leland Stanford Jr. University, Supplementary European Search Report, European Patent Application 04754739.3, Dec. 17, 2007, 4 pgs.
Thearling, Visualizing Data Mining Models, Pub. in Information Visualization in Data Mining and Knowledge Discovery, Fayyad, Grinstein and Wierse, eds., Morgan Kaufman, 2001, 14 pgs.
Welling, Visualization of Large Multi-Dimensional Datasets, arXiv: astro-ph/0008186, Aug. 11, 2000, 6 pgs.
Wilkinson, nViZn: An Algebra-Based Visualization System, Smart Graphics Symposium UK, Hawthorne, NY, Mar. 21-23, 2001, 7 pgs.
Wilkinson, Statistics and Computing—The Grammar of Graphics, Springer-Verlag, Inc., New York, 1999, 417 pgs.

\* cited by examiner

| | Jan | | Feb | | Mar | | Quarter 1 | |
|---|---|---|---|---|---|---|---|---|
| | actuals | variance | actuals | variance | actuals | variance | actuals | variance |
| skin care | 4,156 | 1.01 | 4,572 | 1.01 | 5,034 | 1.01 | 3,846 | 1.01 |
| soap | 2,517 | 1.00 | 2,769 | 1.00 | 3,051 | 1.00 | 8,391 | 1.00 |
| rose water soap | 1,342 | 0.99 | 1,476 | 0.99 | 1,629 | 0.99 | 4,472 | 0.99 |
| olive oil soap | 1,175 | 1.02 | 1,293 | 1.02 | 1,427 | 1.02 | 3,919 | 1.02 |
| lotion | 1,639 | 1.03 | 1,803 | 1.03 | 1,988 | 1.03 | 5,455 | 1.03 |
| hypoallerg. lotion | 1,639 | 1.03 | 1,803 | 1.03 | 1,988 | 1.03 | 5,455 | 1.03 |
| furniture | 4,953 | 1.06 | 5,448 | 1.06 | 5,998 | 1.06 | 16,484 | 1.06 |
| office | 3,796 | 1.09 | 4,176 | 1.09 | 4,598 | 1.09 | 12,625 | 1.09 |
| bookshelves | 1,501 | 0.99 | 1,651 | 0.99 | 1,821 | 0.99 | 4,998 | 0.99 |
| dividers | 2,295 | 1.16 | 2,525 | 1.16 | 2,782 | 1.16 | 7,626 | 1.16 |
| home | 1,157 | 0.99 | 1,273 | 0.99 | 1,405 | 0.99 | 3,860 | 0.99 |
| mattresses | 1,157 | 0.99 | 1,273 | 0.99 | 1,405 | 0.99 | 3,860 | 0.99 |
| All products | 9,109 | 1.04 | 10,020 | 1.04 | 11,027 | 1.04 | 30,331 | 1.04 |

Fig. 2
(PRIOR ART)

| Sales All Products | Jan actuals | variance | Feb actuals | variance | Mar actuals | variance | Quarter 1 actuals | variance |
|---|---|---|---|---|---|---|---|---|
| Northeast | 4,369 | 1.02 | 4,806 | 1.02 | 5,291 | 1.02 | 14,551 | 1.02 |
| Ridgewood | 1,995 | 1.04 | 2,184 | 1.04 | 2,407 | 1.04 | 6,600 | 1.04 |
| Newbury | 1,824 | 1.01 | 2,006 | 1.01 | 2,212 | 1.01 | 6,067 | 1.01 |
| Avon | 560 | 0.97 | 616 | 0.97 | 683 | 0.97 | 1,884 | 0.97 |
| Midwest | 4,74 | 1.06 | 5,214 | 1.06 | 5,740 | 1.06 | 15,779 | 1.06 |
| Francis | 2,643 | 1.11 | 2,907 | 1.11 | 3,203 | 1.11 | 8,778 | 1.11 |
| Nikki's | 1,390 | 1.00 | 1,529 | 1.00 | 1,687 | 1.00 | 4,631 | 1.00 |
| Rogers | 707 | 1.00 | 778 | 1.00 | 860 | 1.00 | 2,370 | 1.00 |
| All companies | 9,109 | 1.04 | 10,020 | 1.04 | 11,027 | 1.04 | 30,331 | 1.04 |

SYSTEMS AND METHODS FOR DISPLAYING DATA IN SPLIT DIMENSION LEVELS

RELATED APPLICATIONS

This application is a continuation of U.S. patent application Ser. No. 12/821,029, filed on Jun. 22, 2010, now U.S. Pat. No. 8,364,724, which is a continuation of U.S. patent application Ser. No. 10/667,194 filed Sep. 16, 2003, now U.S. Pat. No. 7,756,907 which are incorporated herein by reference in their entities.

This application relates to U.S. patent application Ser. No. 11/005,652, titled "Computer Systems and Methods for Visualizing Data with Generation of Marks," filed on Dec. 2, 2004.

All of the above-identified patent applications and patents are hereby incorporated by reference in their entireties.

This invention was made with Government support under contract W-7405-ENG-48 awarded by the Department of Energy. The Government has certain rights in this invention.

1. TECHNICAL FIELD

This disclosure relates generally to computer systems and methods for visualizing data such as database information.

2. BACKGROUND

Imposing meaningful hierarchical structure on large databases provides levels of abstraction that can be leveraged by both the computer and the analyst. These hierarchies can come from several different sources. Some hierarchies are provided by the inherent nature of the database. Data mining algorithms, such as decision trees and clustering techniques that classify the data and thereby automatically derive hierarchies can be used to determine database hierarchy. Part of the analysis task when dealing with automatically generated hierarchies is an understanding and trusting the results. See, for example, 2001, Thearling et al., "Visualizing Data Mining Models" in Information Visualization in Data Mining and Knowledge Discovery, Fayyad, Grinstein and Wierse eds., Morgan Kaufman, which is hereby incorporated by reference in its entirety.

FIG. 1 illustrates the hierarchy for a time dimension. Within the time dimension, there are four levels: "All", "year", "quarter", and "month". Simple hierarchies, like the one shown in FIG. 1, are commonly modeled using a star schema. The entire dimension hierarchy is represented by a single dimension table joined to the base fact table. In this type of hierarchy, there is only one path of aggregation. However, there are more complex dimension hierarchies where the aggregation path can branch. For example, a time dimension might aggregate from "day" to both "week" and "month."

To provide another illustration of the concept of a star schema, consider the case in which one wishes to analyze monthly total product sales for a department store by breaking down the data by region and store. Raw data can come in the form of product managers' (FIG. 2) and regional managers' (FIG. 3) quarterly sales reports. Once the data has been collected and refined, it can reside in a large base table. In addition, there may be adjunct lookup tables. A star schema for this base data is shown in FIG. 4. The table schema of FIG. 4 is called a star schema because the central fact table is depicted as surrounded by each of the dimension tables that describe each dimension. In this example, the base sales data table is the fact table and each lookup table is a dimension table.

The stores, weeks, and products columns in the fact table in FIG. 4 contain numeric values. Fact tables can grow to huge numbers of rows. The lookup tables contain hierarchy information relating each store, week, and product with its higher-level aggregations. For example store 1 in the base table of FIG. 4 connects with the "Store Lookup" table where it has the name Ridgewood and rolls up to the Northeast region. Product 2 in the base table connects with the "Product Lookup" table where it has the name olive oil soap and rolls up into the product type soap in the skin care products group. Thomsen, 1997, OLAP Solutions: Building Multidimensional Information Systems, Wiley Computer Publishing, New York, which is hereby incorporated by reference in its entirety.

The most common schemata found in databases are the star schema and snowflake schema. Each schema has a fact table containing data items of interest (measures) in the analysis for which the database is built. These data items might be transaction amounts such as the amount invested in a mutual fund or the profit on a sales transaction. The fact table is surrounded by dimension tables containing detailed information used to summarize the fact table in different ways. An illustration of a star schema has been provided (FIG. 4). FIG. 5 illustrates a snowflake schema that includes hierarchy. The snowflake and star schema provide a conceptual multidimensional view of the database. The database is a core set of measures characterized by a number of dimensions rather than a set of interrelated tables. This organization correlates directly with the typical analysis query that summarizes a few quantitative attributes (or measures) such as profit or sales by several characterizing attributes (or dimensions) such as product, location, or date over a large number of tuples. The primary differences between the star and snowflake schema arise in how they model hierarchical structures on the dimensions.

When referring to values within a dimension hierarchy, a dotted notation can be used to specify a specific path from the root level "All" (FIG. 1) of the hierarchy down to the specified value. Specifically, to refer to a value on level m of a hierarchy, the dimension name is first optionally listed, then zero or more of the (m−1) intermediate ancestor values, and then finally the value on the mth level, all separated by periods. For example, the Jan node on the Month level in the time hierarchy that corresponds to January, 1998, can be referred to as 1998.Qtrl.Jan. When this notation is used, the reference is called a qualified value. When a value is simply described by its node value (without any path to the root node) the reference is called an unqualified value.

One form of database is a relational warehouse, such as a structured query language (SQL) database. Relational warehouses organize data into tables. Each row in a table corresponds to a basic entity or fact and each column represents a property of that entity. See, for example, Thomsen, 1997, OLAP Solutions: Building Multidimensional Information Systems, Wiley Computer Publishing, New York. For example, a table may represent transactions in a bank, where each row corresponds to a single transaction. As such, each transaction can have multiple properties, such as the transaction amount, the account balance, the bank branch, and the customer. As used herein, a row in a table is referred to as a tuple or record, and a column in the relation is referred to as a field. Such tables are also referred to as relations. As such, a relation is defined as a database table that contains a set of tuples.

It is possible to create dimension tables and star schemas in relational warehouses. A single relational warehouse will contain many heterogeneous but interrelated tables. The fields (columns) within a table can be partitioned into two types: dimensions and measures. Dimensions and measures are similar to independent and dependent variables in traditional analysis. For example, the bank branch and the customer are dimensions, while the account balance is a measure.

Business intelligence requires tools for interactive visualization of multi-dimensional databases. The prior art provides a number of approaches to visualizing such information. For example, FIG. 17 illustrates a screen shot from a Microsoft Analysis Services interface to a multi-dimensional database that includes a Time dimension having the levels year and quarter. In another example, FIG. 18 illustrates a Microsoft Excel Pivot-Table interface to a multi-dimensional database. Although the software programs illustrated in FIGS. 17 and 18 are useful, they are often unsatisfactory. Such interfaces restrict the construction of the table so that levels from a single dimension must appear on the same axis (e.g., the rows or columns) and must be in their natural hierarchical order. Thus, in FIG. 18, if a user attempts to move Year to the rows and leave Quarter on the columns, the interface will move all levels (Years as well as Quarters) to the rows. Similarly, it is not possible to skip levels in the defined hierarchies. For example, if Year and Month were to appear on the axis then Quarter must also appear is the hierarchical source of the data includes such a level. These limitations are not just cosmetic constraints. They limit the types of analysis that can be performed on the data using such graphical interfaces.

Based on the above background, what is needed in the art are improved methods and graphical interfaces for visualizing data that includes dimensions and measures.

3. SUMMARY

The present disclosure provides improved methods for visualizing data. In the present disclosure, dimensions are not constrained to lie on a single axis of a graphical interface. Further, dimensions are not constrained such that they must appear in their natural hierarchical order. Accordingly, the present disclosure provides advantageous methods and graphical interfaces for displaying data.

A first aspect of the present disclosure provides a method of forming a visual plot using a hierarchical structure of a dataset. The dataset comprises a measure and a dimension. The dimension consists of a plurality of levels. The plurality of levels form a dimension hierarchy. In the method, the visual plot is constructed based on a specification. A first level from the plurality of levels is represented by a first component of the visual plot. A second level from the plurality of levels is represented by a second component of the visual plot. The dataset is queried to retrieve data in accordance with the specification. The data includes all or a portion of the dimension and all or a portion of the measure. Finally, the visual plot is populated with the retrieved data in accordance with the specification.

A second aspect of the present disclosure provides a computer program product for use in conjunction with a computer system. The computer program product comprises a computer readable storage medium and a computer program mechanism embedded therein. The computer program mechanism forms a visual plot using a hierarchical structure of a dataset. The dataset comprises a measure and a dimension as described in the first aspect of the present disclosure. The computer program mechanism comprises instructions for constructing the visual plot based on a specification. A first level from the plurality of levels is represented by a first component of the visual plot and a second level from the plurality of levels is represented by a second component of the visual plot. The computer program mechanism further comprises instructions for querying the dataset to retrieve data in accordance with the specification. The data includes all or a portion of the dimension and all or a portion of the measure. Finally, the computer program mechanism comprises instructions for populating the visual plot with the retrieved data in accordance with the specification.

A third aspect of the invent provides a computer system for forming a visual plot using a hierarchical structure of a dataset. The dataset comprises a measure and a dimension as described in the first aspect of the present disclosure. The computer system comprises a central processing unit and a memory coupled to the central processing unit. The memory stores a programming module. In some embodiments the memory stores the dataset whereas in other embodiments the dataset is accessed by a remote server. The programming module comprises instructions for constructing the visual plot based on a specification. A first level from the plurality of levels is represented by a first component of the visual plot and a second level from the plurality of levels is represented by a second component of the visual plot. In some embodiments, the specification is obtained from a remote server. The programming module further comprises instructions for querying the dataset to retrieve data in accordance with the specification, the data including all or a portion of the dimension and all or a portion of the measure. Further, the programming module includes instructions for populating the visual plot with the retrieved data in accordance with the specification. In some embodiments, all or a portion of the programming module is distributed on remote servers and/or on client computers.

4. BRIEF DESCRIPTION OF THE DRAWINGS

FIG. 2 illustrates raw data in the form of product managers' quarterly sales reports in accordance with the prior art.

FIG. 3 illustrates raw data in the form of regional managers' quarterly sales reports in accordance with the prior art.

Figure 9:
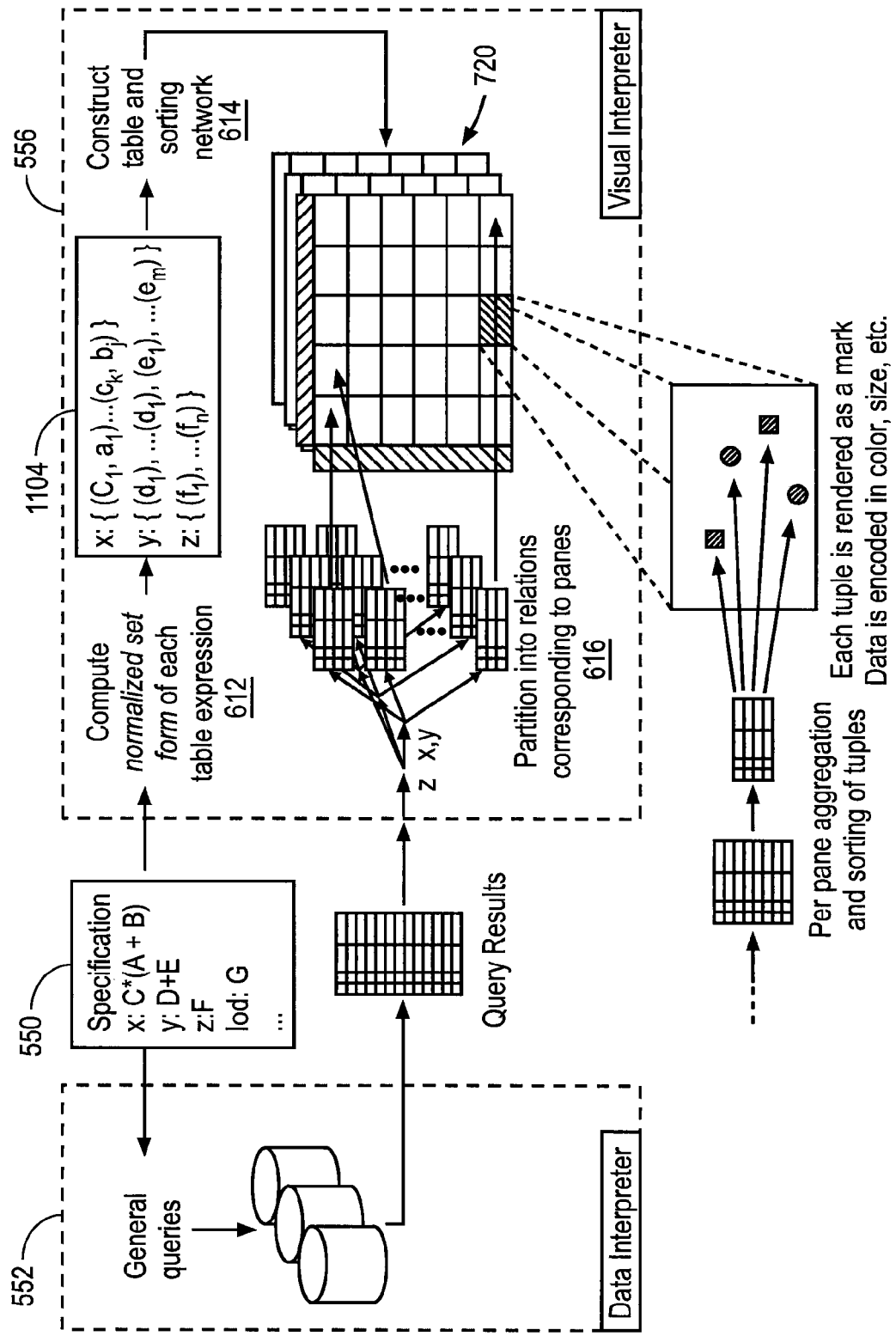

FIG. 9 provides an exemplary view of processing steps in accordance with one embodiment of the present disclosure.

Figure 10:
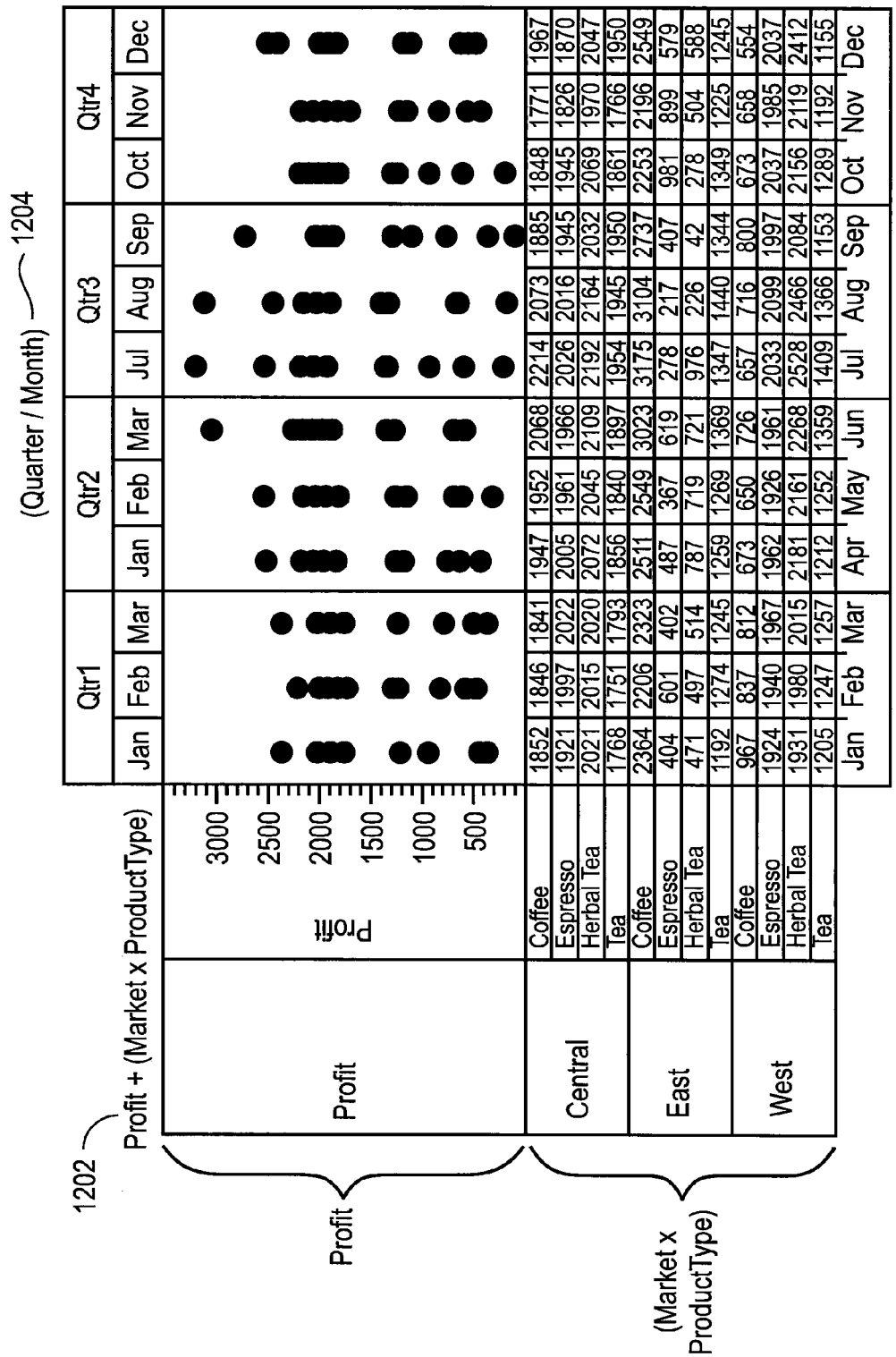
Figure 11:
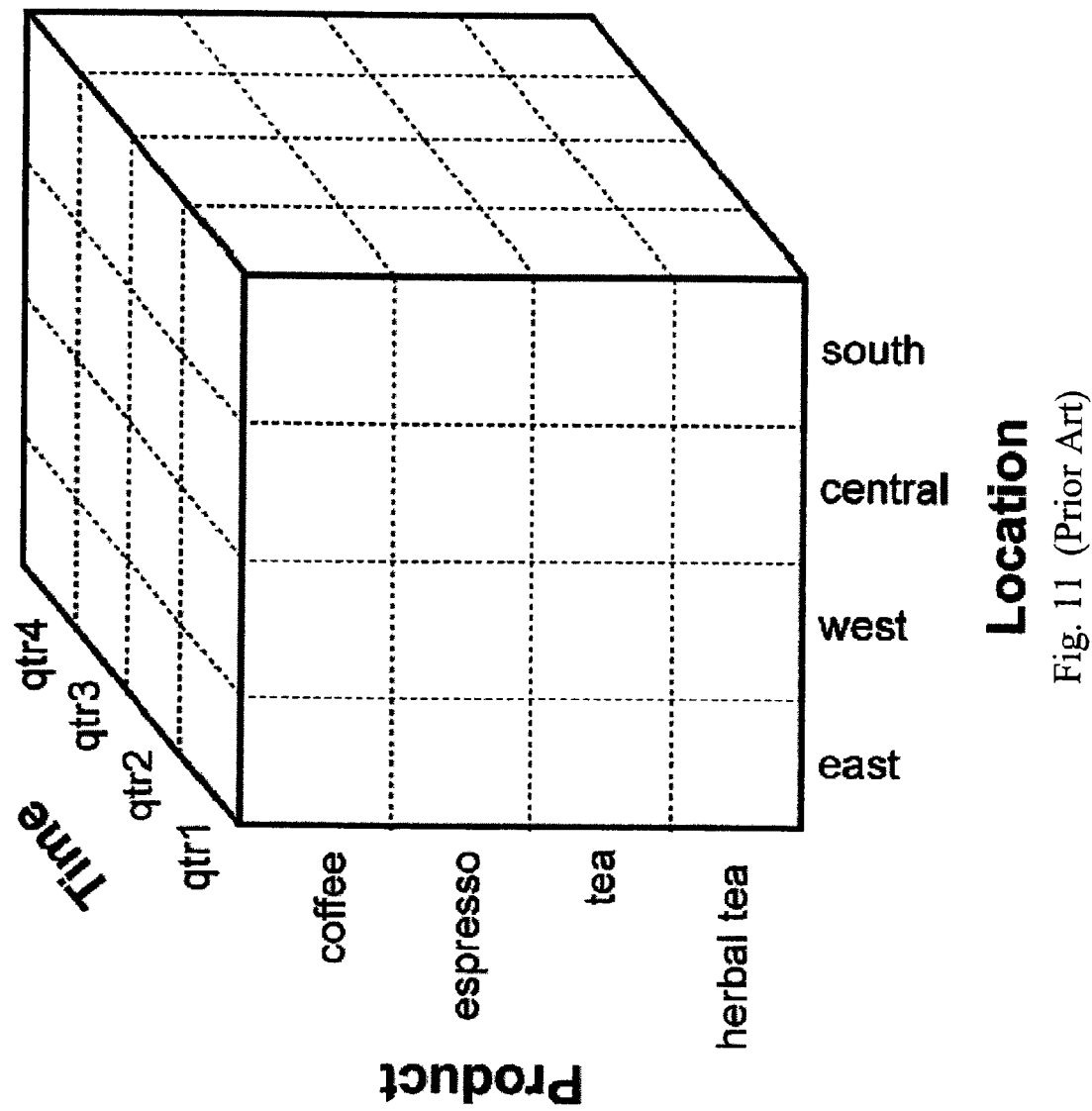

FIG. 10 illustrates the configuration for a table that has been generated from the normalized set form of a visual specification in accordance with one embodiment of the present disclosure FIG. 11 illustrates a data cube for a hypothetical coffee chain in which each axis in the data cube corresponds to a level of detail for a dimension (product, location, time) in a database schema, in accordance with the prior art.

Figure 12:
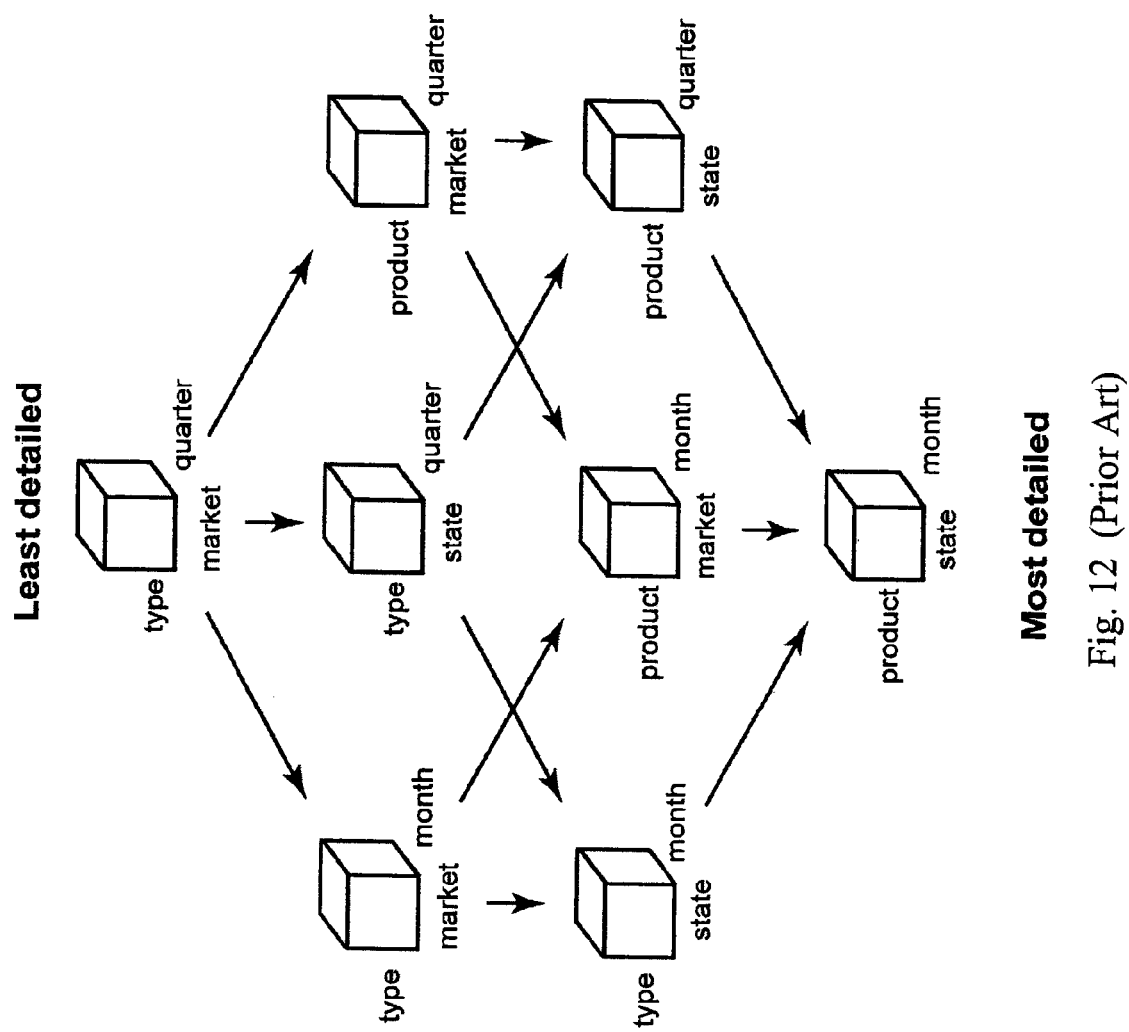

FIG. 12 illustrates a lattice of data cubes for a particular database schema in which each dimension has a hierarchical structure, in accordance with the prior art.

Figure 13:
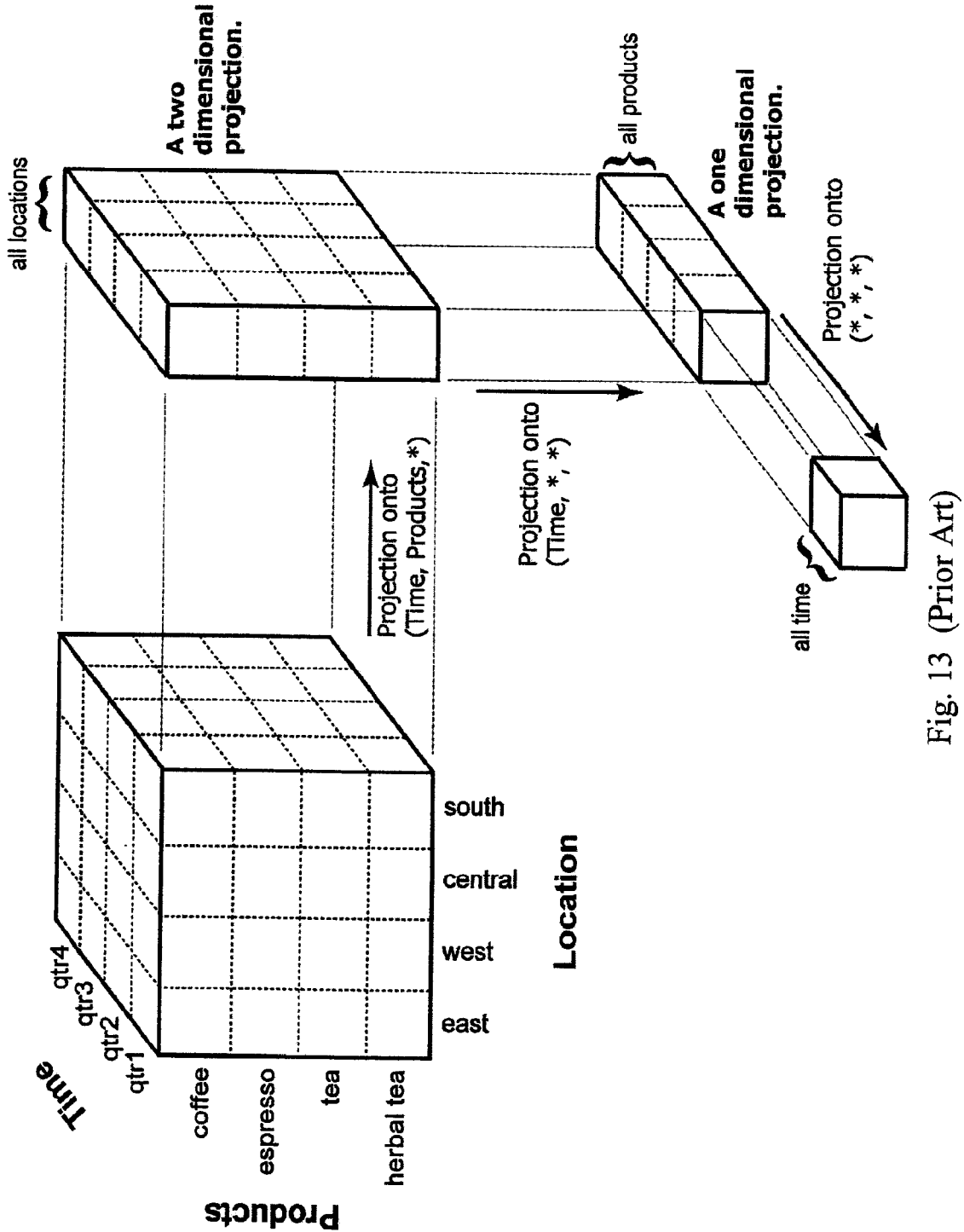

FIG. 13 illustrates the projection of a 3-dimensional data cube thereby reducing the dimensionality of the data cube by aggregating across dimensions that are not of interest to an analysis, in accordance with the prior art.

Figure 14:
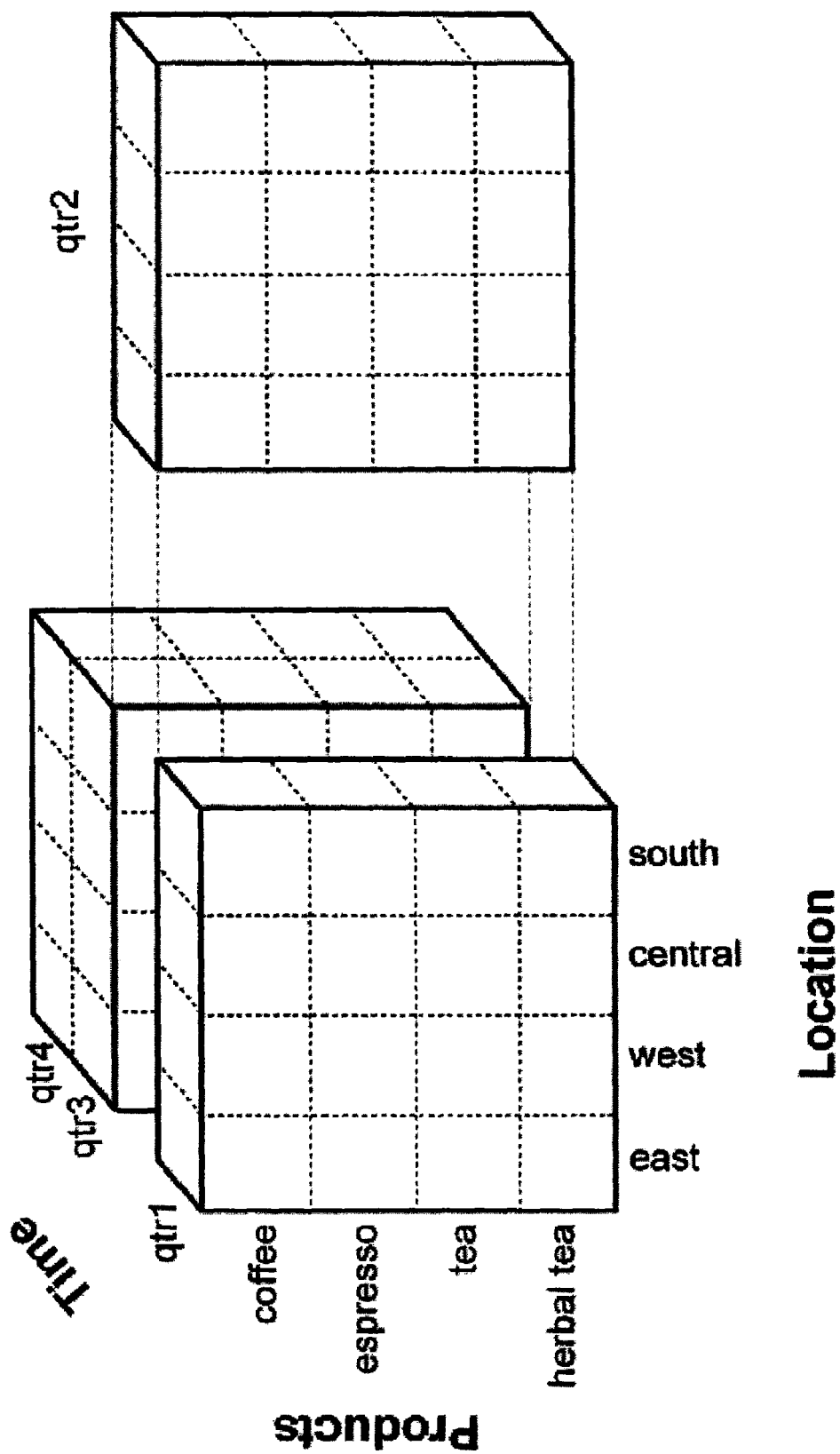

FIG. 14 illustrates the construction of a slice of a data cube by filtering the members of one or more dimensions of the cube, in accordance with the prior art.

Figure 15:
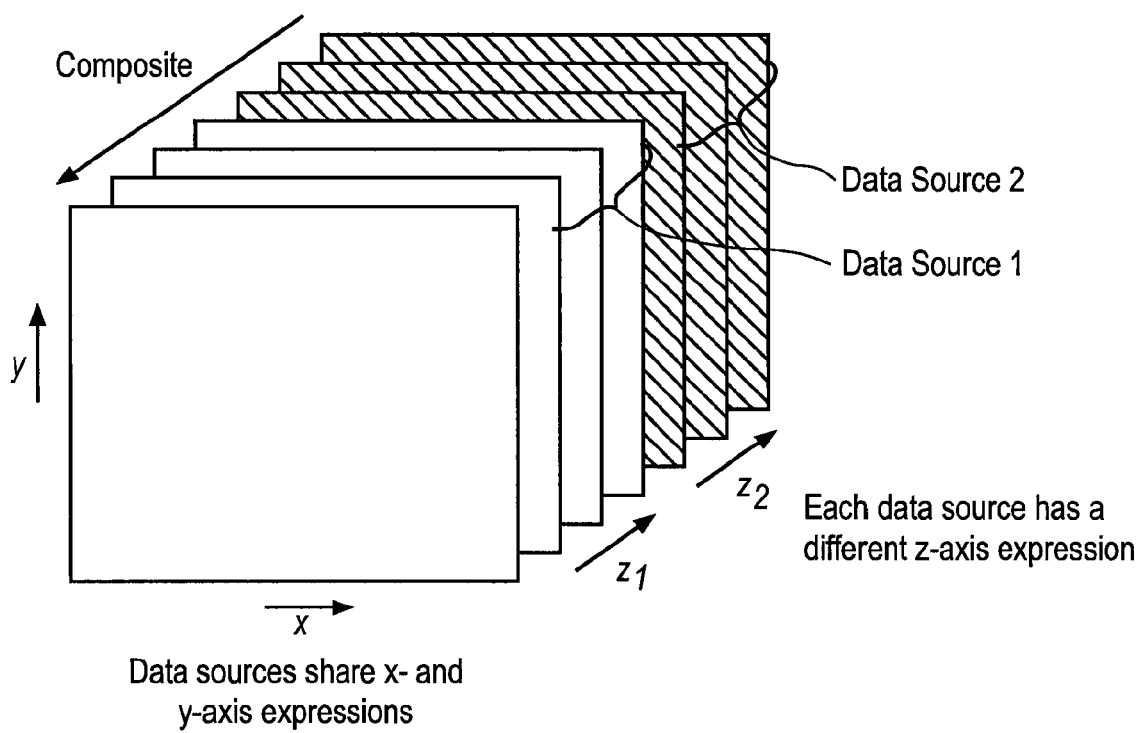

FIG. 15 illustrates the layering of multiple data sources and the partitioning of layers in accordance with one embodiment of the present disclosure.

Figure 16:
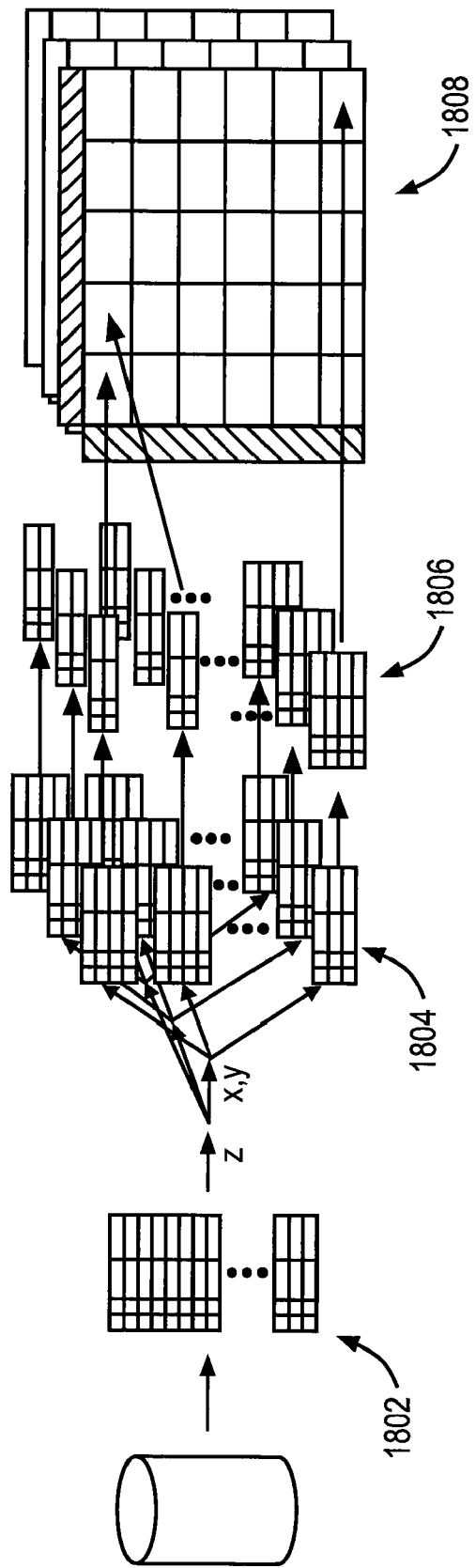

FIG. 16 illustrates the association of a subset of tuples with a pane in one or more panes in a visual table in accordance with one embodiment of the present disclosure.

Figure 17:
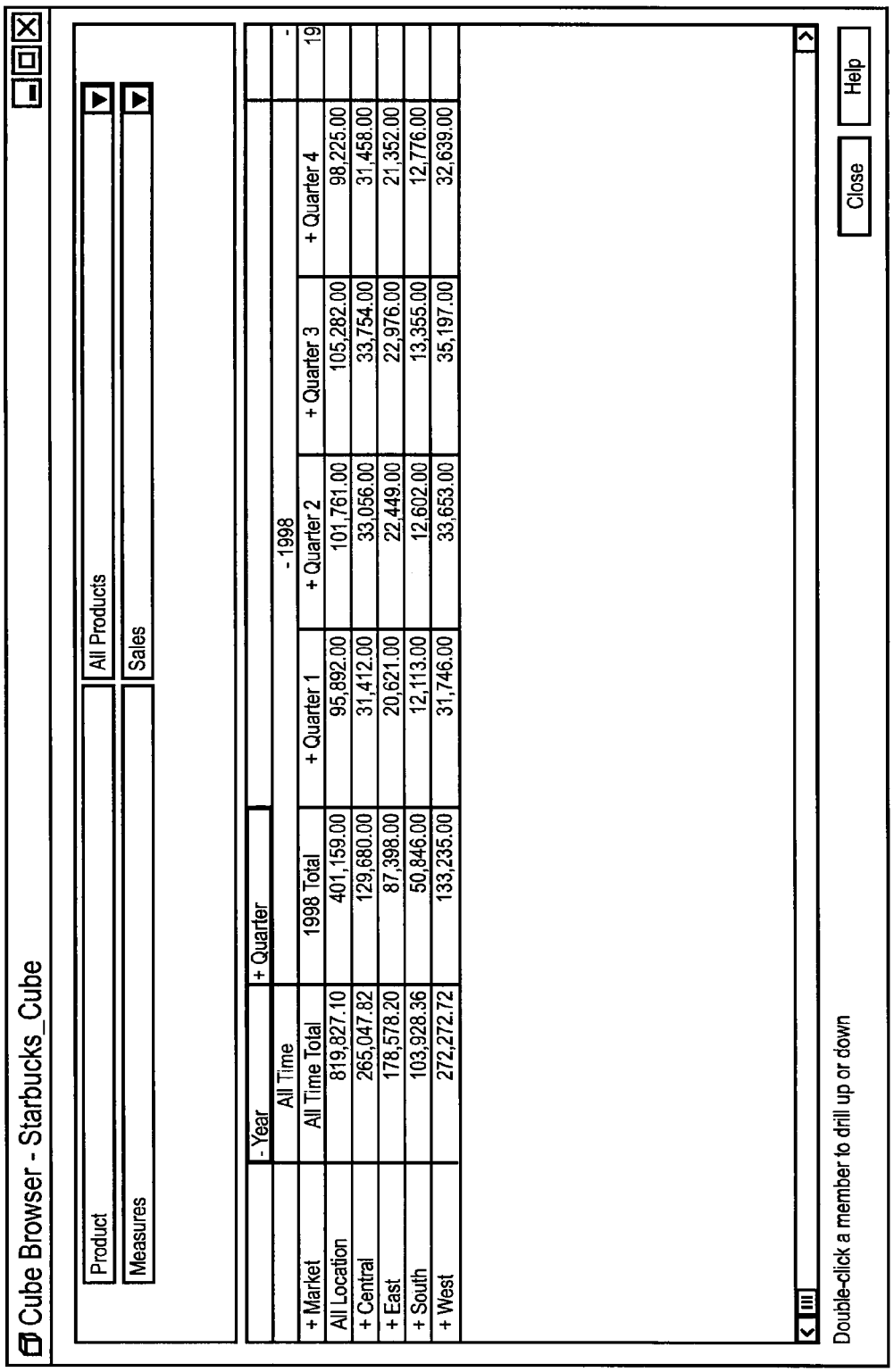

FIG. 17 illustrates an interface for displaying the levels (year, quarter) of the time dimension of a multi-dimensional database in accordance with the prior art.

Figure 18:
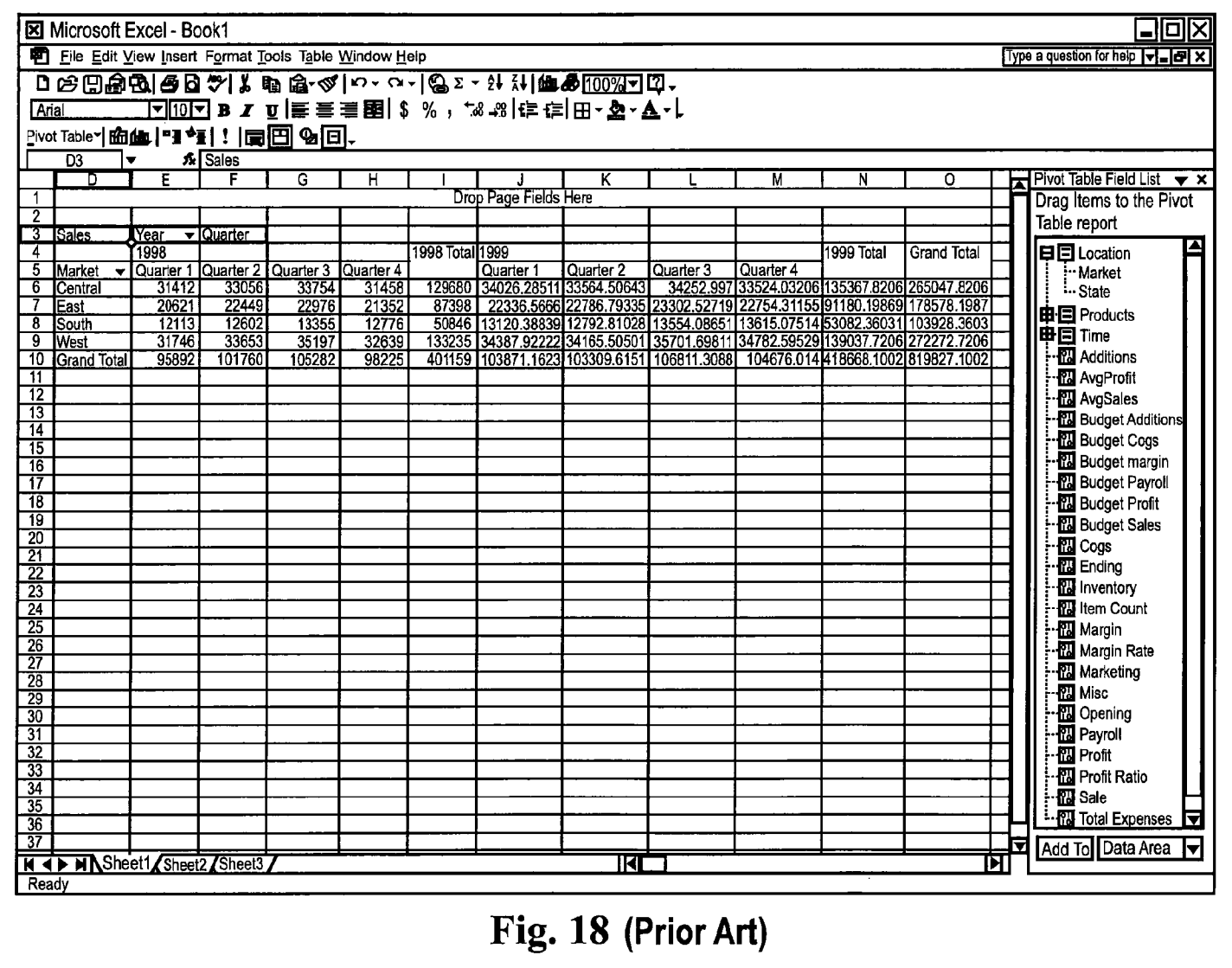

FIG. 18 illustrates an interface for displaying the levels (year, quarter) of the time dimension of a multi-dimensional database in accordance with the prior art.

Figure 19:
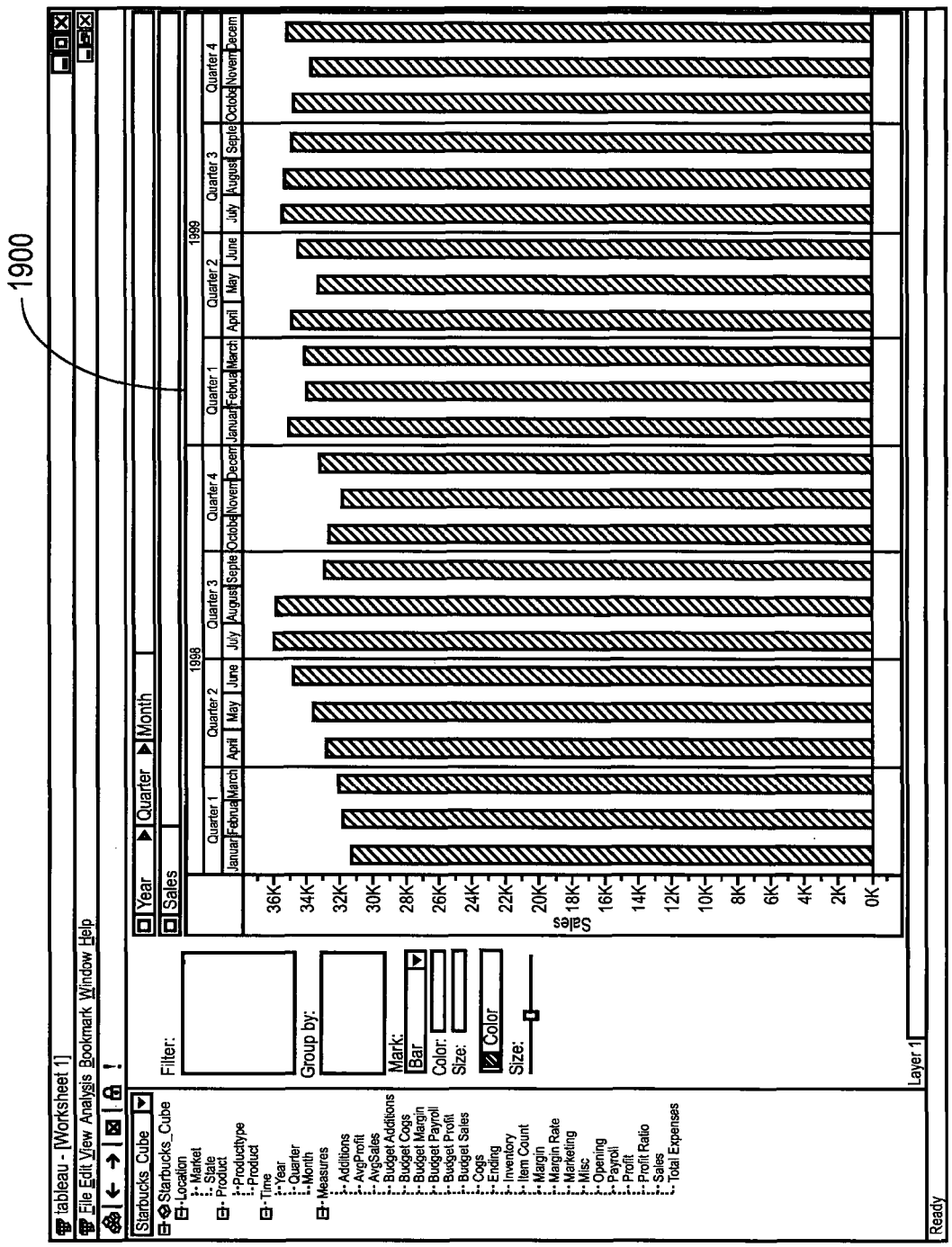

FIG. 19 illustrates a visual plot that shows the natural hierarchical display of levels of the time dimension (years, quarters, months) for sales data.

Figure 20:
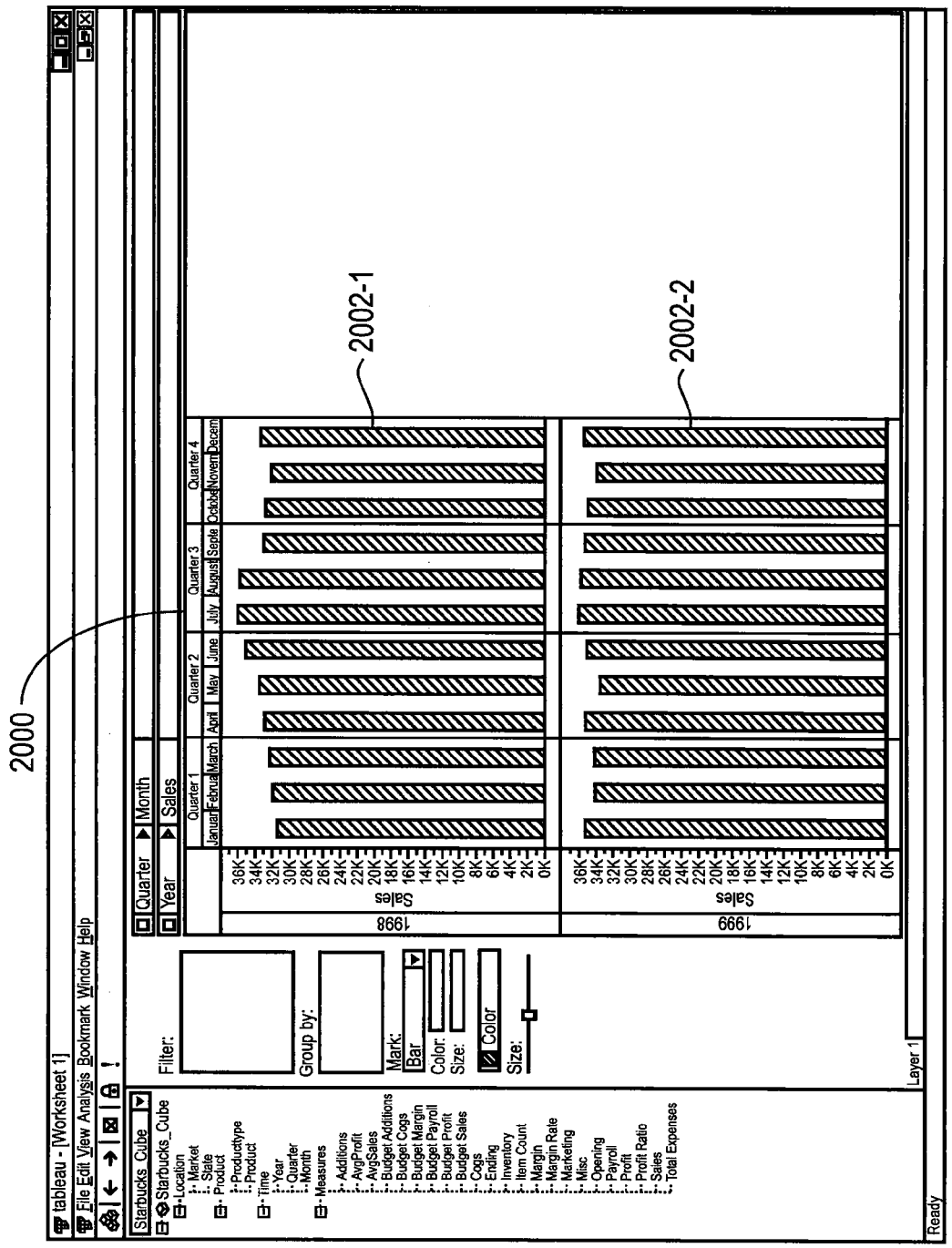

FIG. 20 illustrates a visual plot having the format [Time]. [Year]*[Sales] (rows, y-axis) versus [Time].[Quarter]. [Month] (columns, x-axis) in accordance with one embodiment of the present disclosure.

Figure 21:
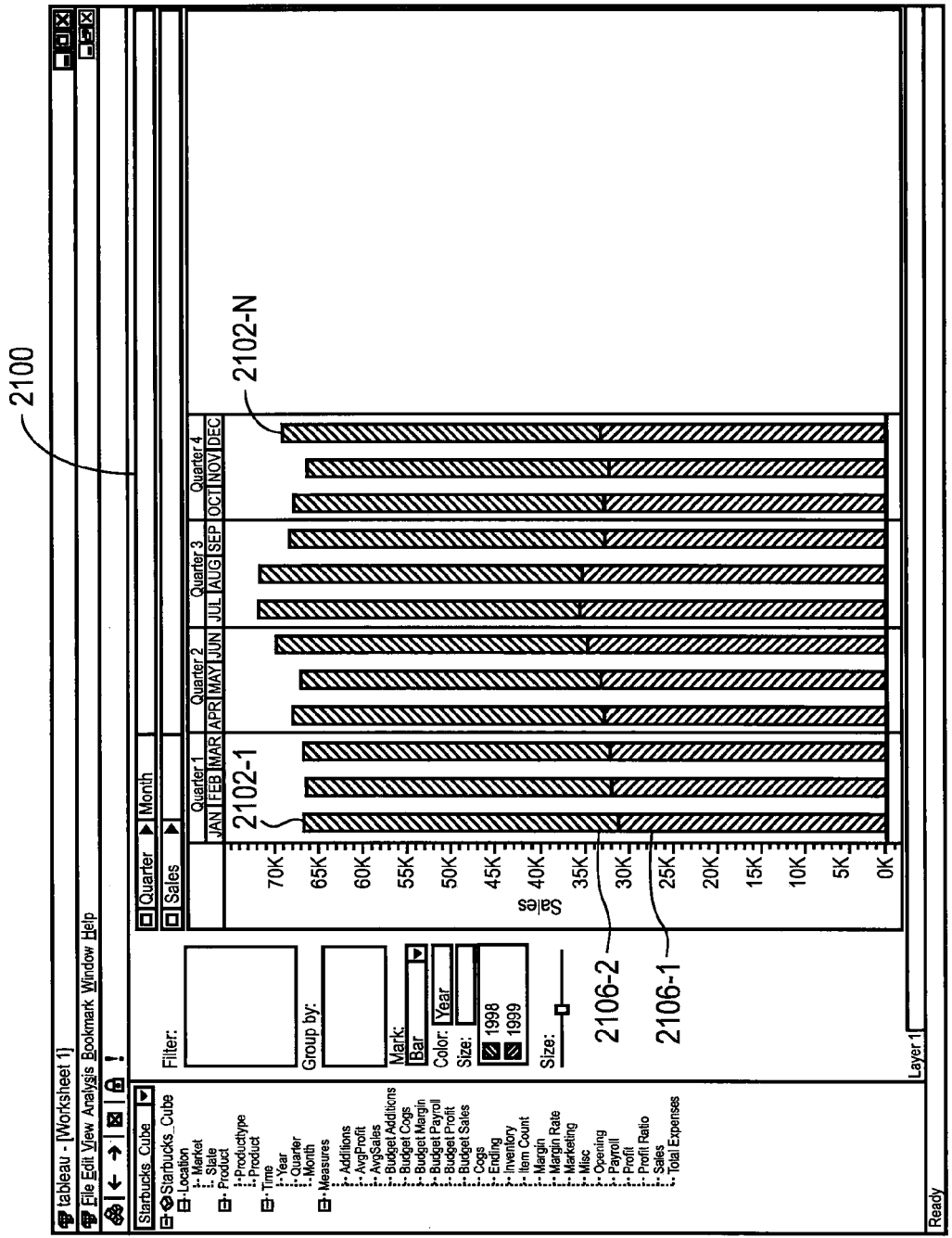

FIG. 21 illustrates a visual plot in accordance with an embodiment of the present disclosure in which a level of a dimension hierarchy is used as a level of detail for a graphic.

Figure 22:
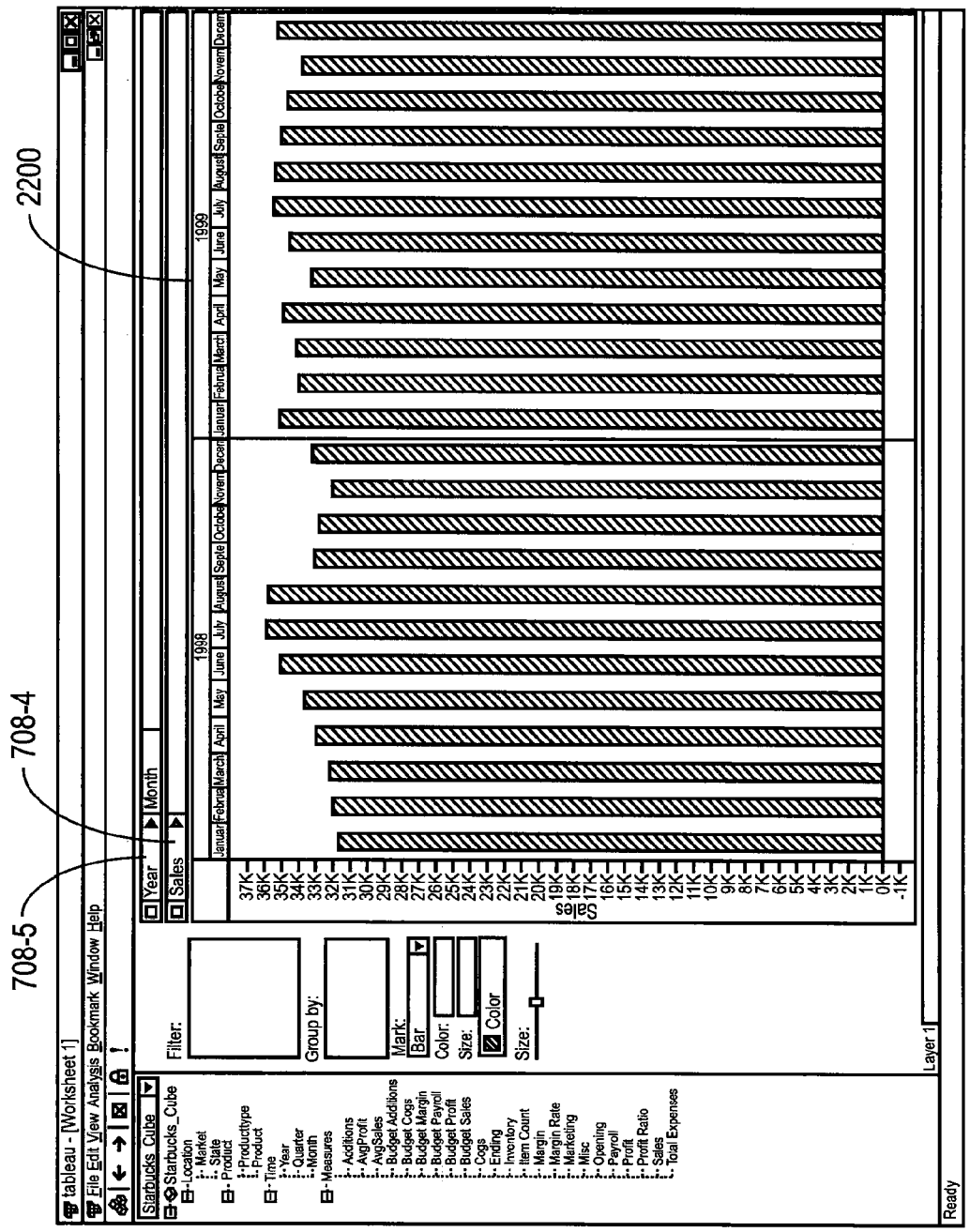

FIG. 22 illustrates a visual plot in which a dimension is skipped, in accordance with one embodiment of the present disclosure.

Figure 23:
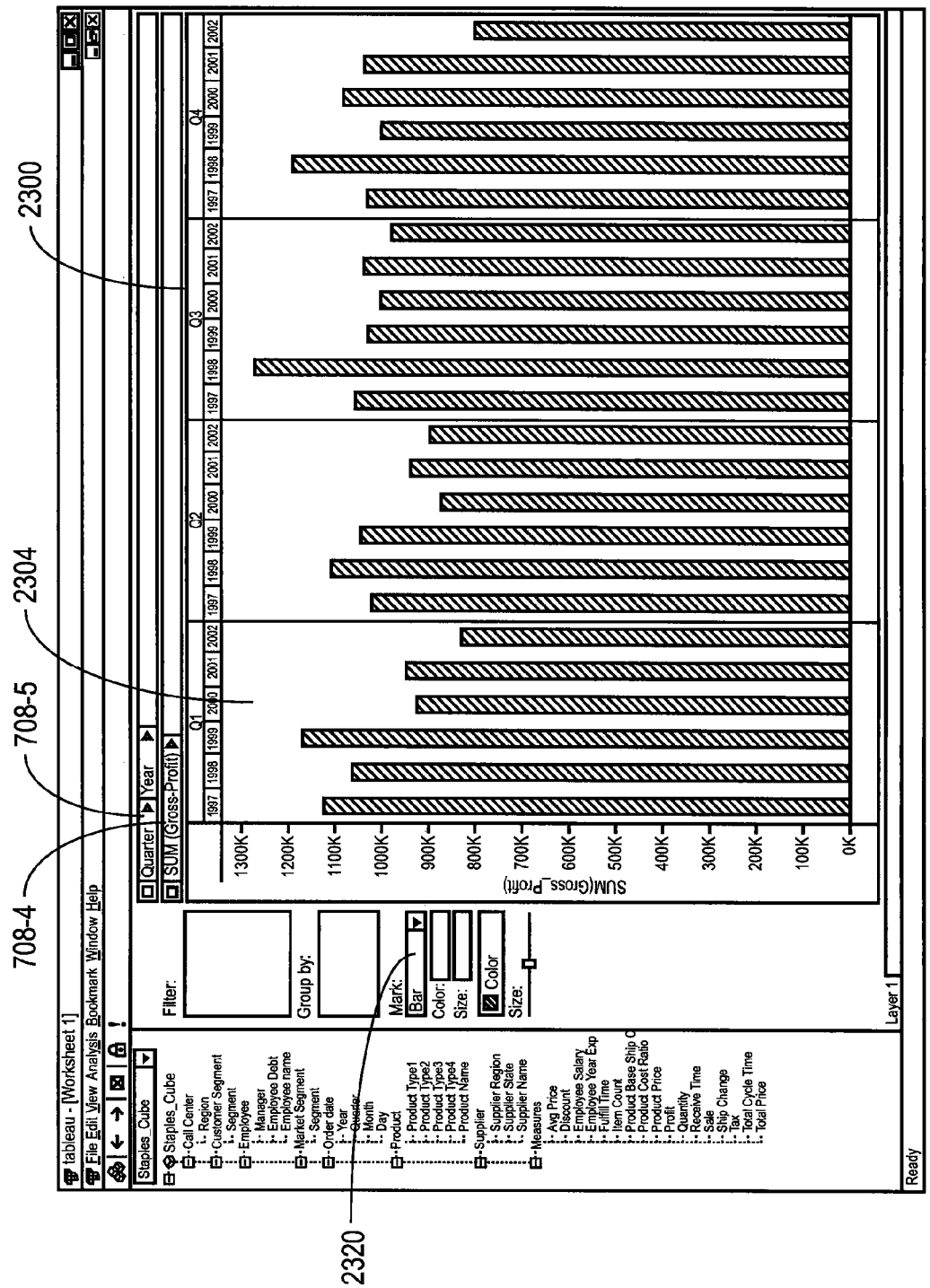

FIG. 23 illustrates a visual plot in which the set of levels from a dimension hierarchy found in an underlying dataset is represented by a first component but in an order that deviates from an order found in the dimension hierarchy, in accordance with an embodiment of the present disclosure.

Figure 24:
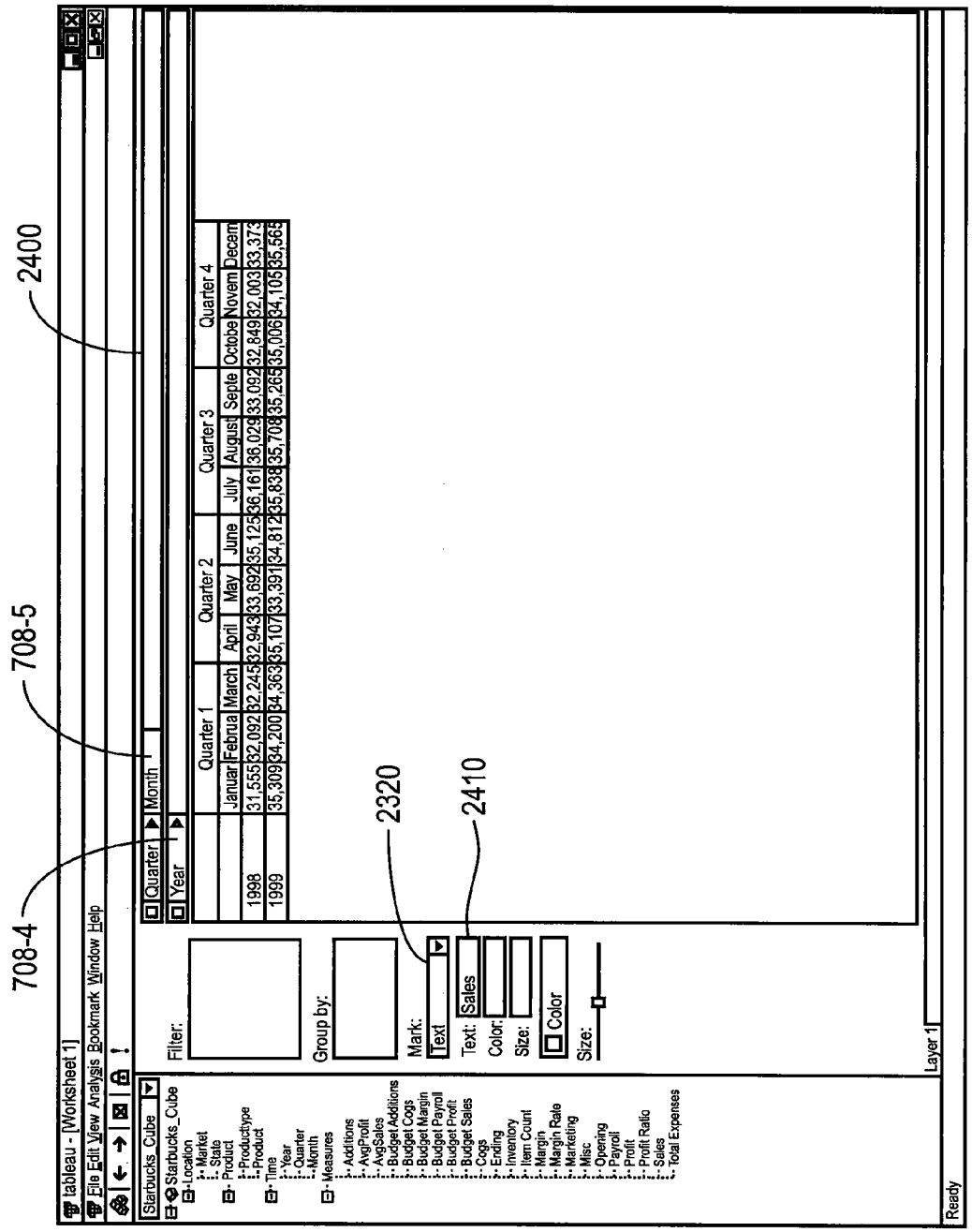

FIG. 24 illustrate a visual plot in which the time dimension is found on two axis in accordance with an embodiment of the present disclosure.

Figure 25:
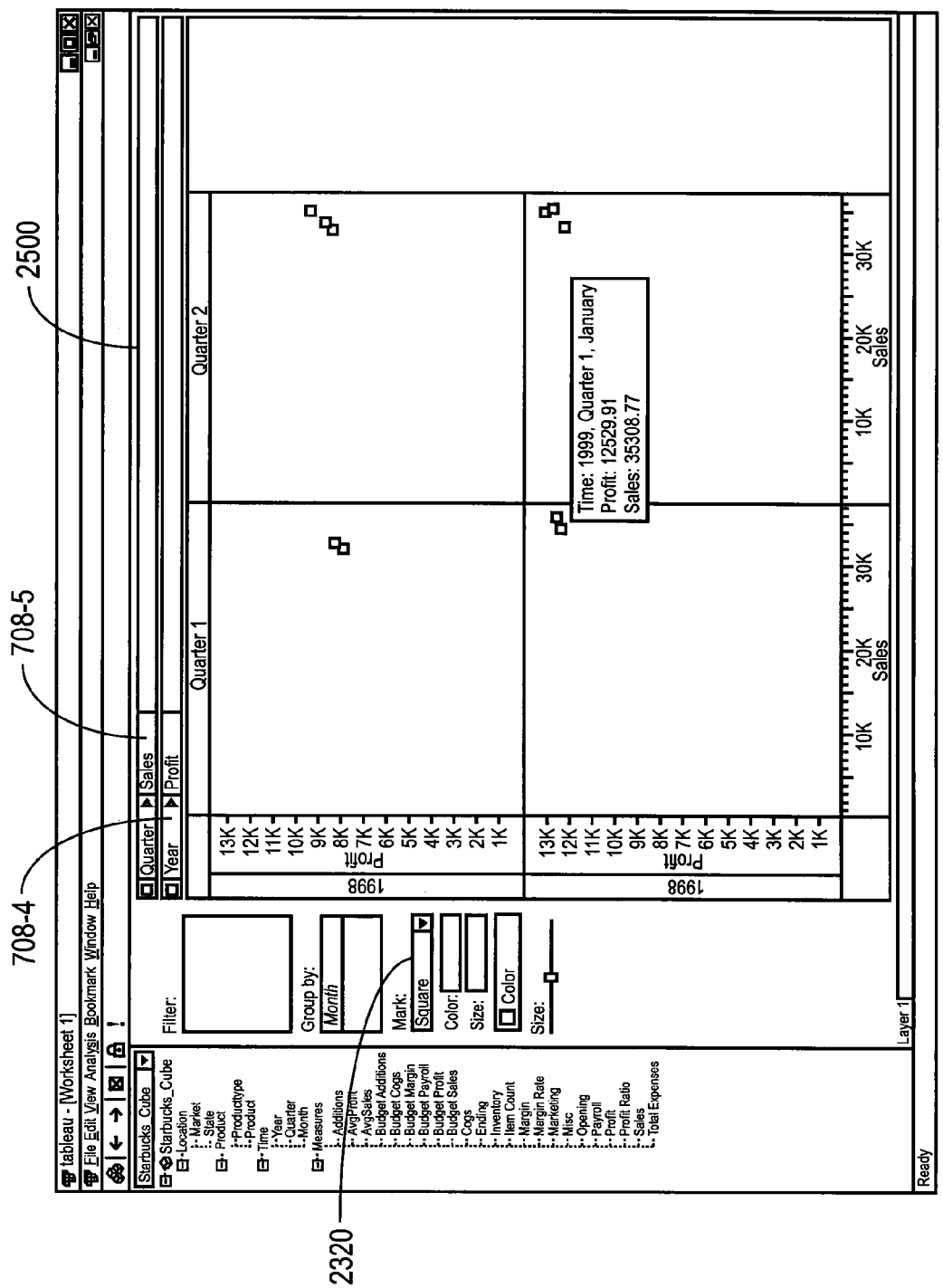

FIG. 25 illustrates a visual plot that encodes sales data in a segmented scatterplot in accordance with an embodiment of the present disclosure.

Like reference numerals refer to corresponding parts throughout the several views of the drawings.

5. DETAILED DESCRIPTION

The present disclosure provides computer systems and methods for visualizing data such as database information. In a typical embodiment of the present disclosure, a user specifies a search query and data is displayed in a graphic. Advantageously, in the computer systems and methods of the present disclosure, a dimension can be displayed on more than one axis of the graphic. More specifically, levels in a dimension can span multiple axes, group bys, and visual encodings. Furthermore, levels (e.g., quarter, month) within dimensions are not constrained to their natural hierarchical order. In fact, levels defined in a hierarchy can be skipped. Another advantage of the present disclosure is that measures are not constrained to text table format; they can be illustrated in any of a number of graphical manifestations.

Presented in Section 5.1 below is an overview of an exemplary system for visualizing database queries. The system can be used to visualize database queries using the methods of the present disclosure. Section 5.1 is merely an exemplary system however. The data visualization methods of the present disclosure are not limited to the visualization of database query results. The data visualization methods of the present disclosure can be used to visualize any form of data that includes dimensions and measures, including, for example, spreadsheets.

Section 5.2 below illustrates an exemplary method for forming a database query that advantageously uses the hierarchical structure that is either (i) explicitly defined in a database or that (ii) can be derived from the database. The exemplary method displays queries that are formed using a visual specification in a visual table. Section 5.3 provides more details on databases that can be optionally queried using the methods of the present disclosure. Section 5.3 provides further information on visual tables of the present disclosure, as well a conceptual data flow in accordance with some embodiments of the present disclosure.

Section 5.4 details the many advantageous features of the present disclosure, including the ability to represent dimensions across multiple axes, the ability to represent measures in data forms that are not limited to text tables, the ability to display levels of a dimension in orders that are not limited to their natural hierarchical order, and the ability to skip the display of levels in a defined hierarchy.

5.1 Overview of an Exemplary System

Figure 6:
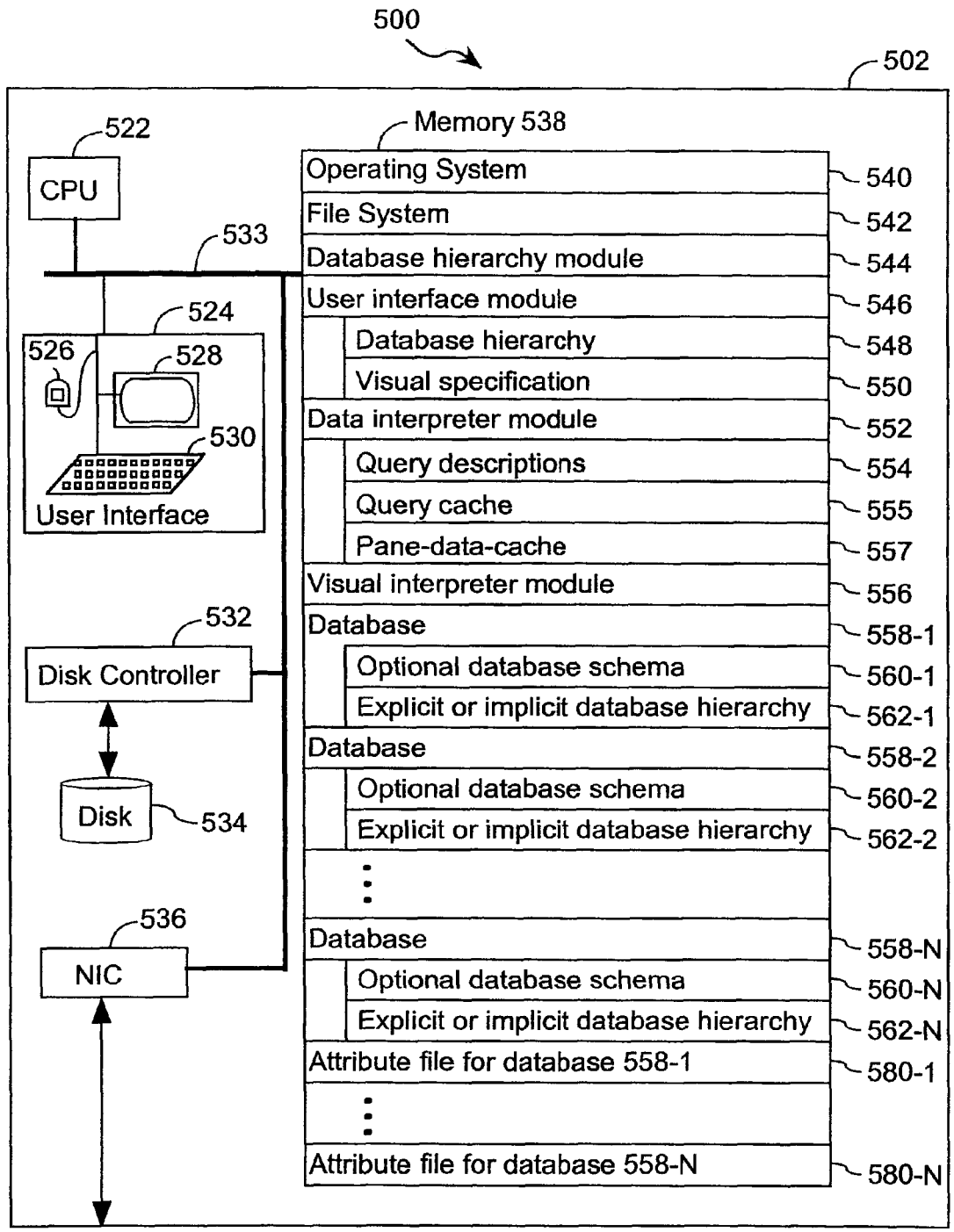
FIG. 6 illustrates a computer system that facilitates exploratory analysis of databases having a hierarchical structure in accordance with one embodiment of the present disclosure.

FIG. 6 shows a system 500 that facilitates exploratory analysis of databases, such as data warehouses, in accordance with one embodiment of the present disclosure.

System 500 preferably comprises a computer 502 that includes:

- a central processing unit 522;
- a main non-volatile storage unit 534, preferably including one or more hard disk drives, for storing software and data, the storage unit 534 typically controlled by disk controller 532;
- a system memory 538, preferably high speed random-access memory (RAM), for storing system control programs, data, and application programs, including programs and data loaded from non-volatile storage unit 534; system memory 538 may also include read-only memory (ROM);
- a user interface 524, including one or more input devices, such as a mouse 526, a keypad 530, and a display 528;
- an optional network interface card 536 for connecting to any wired or wireless communication network; and
- an internal bus 533 for interconnecting the aforementioned elements of the system.

Operation of computer 502 is controlled primarily by operating system 540, which is executed by central processing unit 522. Operating system 540 can be stored in system memory 538. In addition to operating system 540, a typical implementation of system memory 538 includes:

- file system 542 for controlling access to the various files and data structures used by the present disclosure;
- database hierarchy module 544 for interpreting the hierarchy of a database 558 (e.g., by interpreting the database schema);
- user interface module 546 for obtaining a visual specification (specification) from the user (for constructing a visual table, comprised of one or more panes, by obtaining from a user a specification that is in a language based on the hierarchical structure of database 558);
- data interpreter module 552 for formulating database queries based on the specification (for querying database 558 to retrieve a set of tuples or objects in accordance with the specification); and visual interpreter module 556 for processing database query results and displaying these results in accordance with the specification (for associating a subset of the set of tuples or objects with a pane in the one or more panes).

In some embodiments, user interface module 546 includes:
a database hierarchy 548 that corresponds to the hierarchy of a database 558; and
a visual specification 550 that specifies a formalism that can be used to determine the exact analysis, query, and drawing operations to be performed by the system.

In one embodiment, data interpreter module 552 includes:
one or more query descriptions 554 that are used to query databases;
a query cache 555 that is used to store database query results; and
a pane-data-cache 557 that is used to store a separate data structure for each pane 722 (FIG. 7) in a visual table 720 that is displayed by visual interpreter module 556.

System 500 includes one or more databases 558. In one embodiment a database 558 is OLAP data that can be viewed conceptually as a multidimensional data cube. See, for example, Section 5.3. More generally, database 558 is any form of data storage system, including but not limited to a flat file, a relational database (SQL), and an OLAP database (MDX and/or variants thereof). In some specific embodiments, database 558 is a hierarchical OLAP cube. In some specific embodiments, database 558 comprises star schema that is not stored as a cube but has dimension tables that define hierarchy. Still further, in some embodiments, database 558 has hierarchy that is not explicitly broken out in the underlying database or database schema (e.g., dimension tables are not hierarchically arranged). In such embodiments, the hierarchical information for the respective database 558 can be derived. For example, in some instances, database hierarchy module 544 reads database 558 and creates a hierarchy representing data stored in the database. In some embodiments, this external program is run with user input. In some embodiments, there is only a single database 558.

In typical embodiments, one or more of databases 558 are not hosted by computer 502. Rather, in typical embodiments, databases 558 are accessed by computer 502 using network interface 536. In some embodiments an attribute file 580 is associated with each database 558. Attributes are discussed in Section 5.3.6, below.

Figure 5:
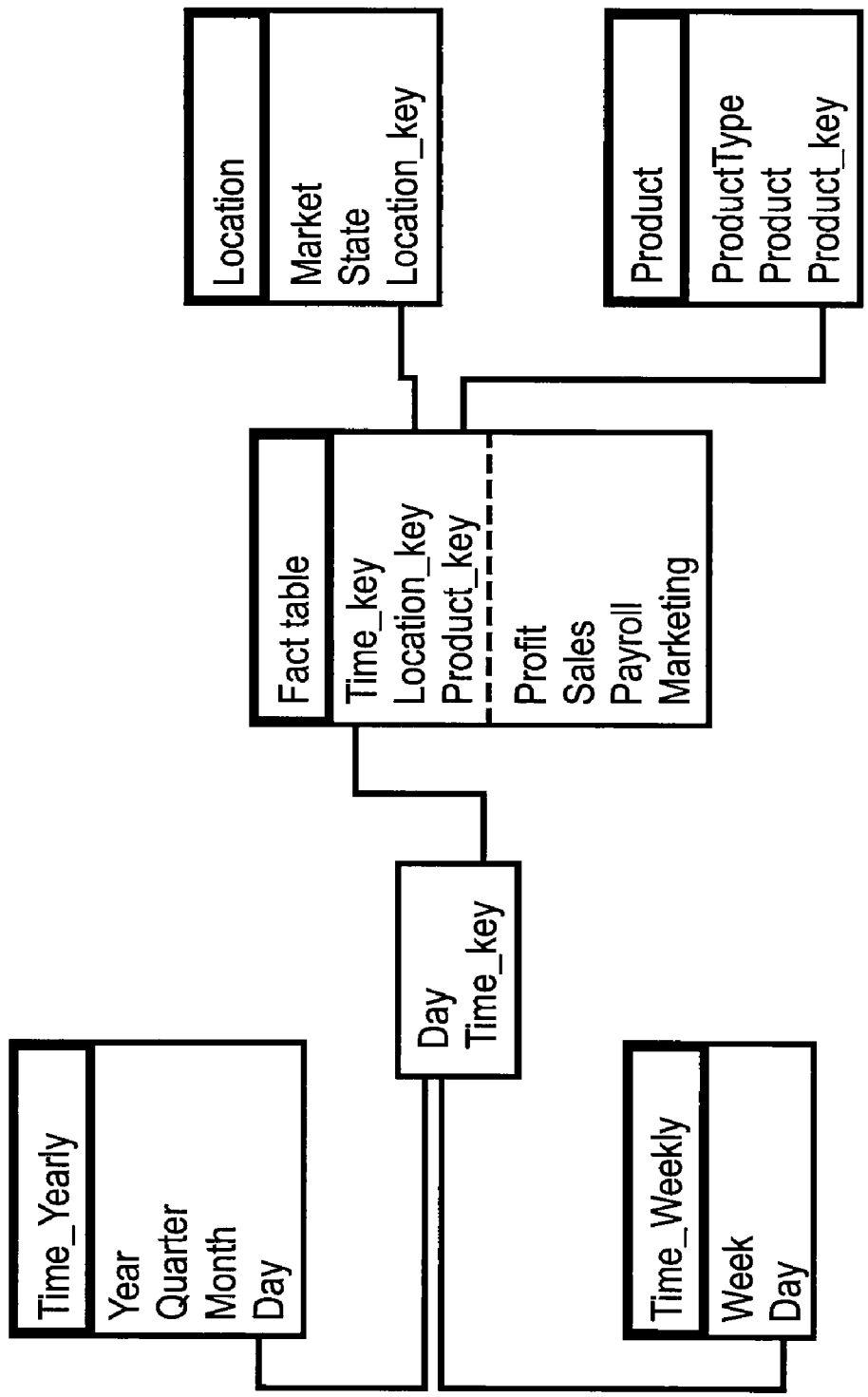
FIG. 5 illustrates a snowflake schema for a database in accordance with the prior art.

It will be appreciated that many of the modules illustrated in FIG. 5 can be located on a remote computer. For example, some embodiments of the present application are web service-type implementations. In such embodiments, user interface module 546 can reside on a client computer that is in communication with computer 502 via a network (not shown). In some embodiments, user interface module 546 can be an interactive web page that is served by computer 502 to the client computer. Further, some or all of the components of visual interpreter module 556 can reside on the client computer so that the results of a query are displayed on the client computer. Thus, the present disclosure fully encompasses a broad array of implementations in which one or more users can explore one or more databases 558 using the techniques and methods of the present disclosure from a remote site. The illustration of the modules in FIG. 5 in a single central computer is merely presented to concisely illustrate certain software modules and data structures that are used in various embodiments of the present disclosure and in no way is limiting. Those of skill in the art will appreciate that numerous other configurations are possible and all such configurations are within the scope of the present disclosure.

Now that an overview of a system 500 in accordance with one embodiment of the present disclosure has been described, various advantageous methods in accordance with the present disclosure will now be disclosed in the following sections.

5.2 Exemplary Method

Figure 7:
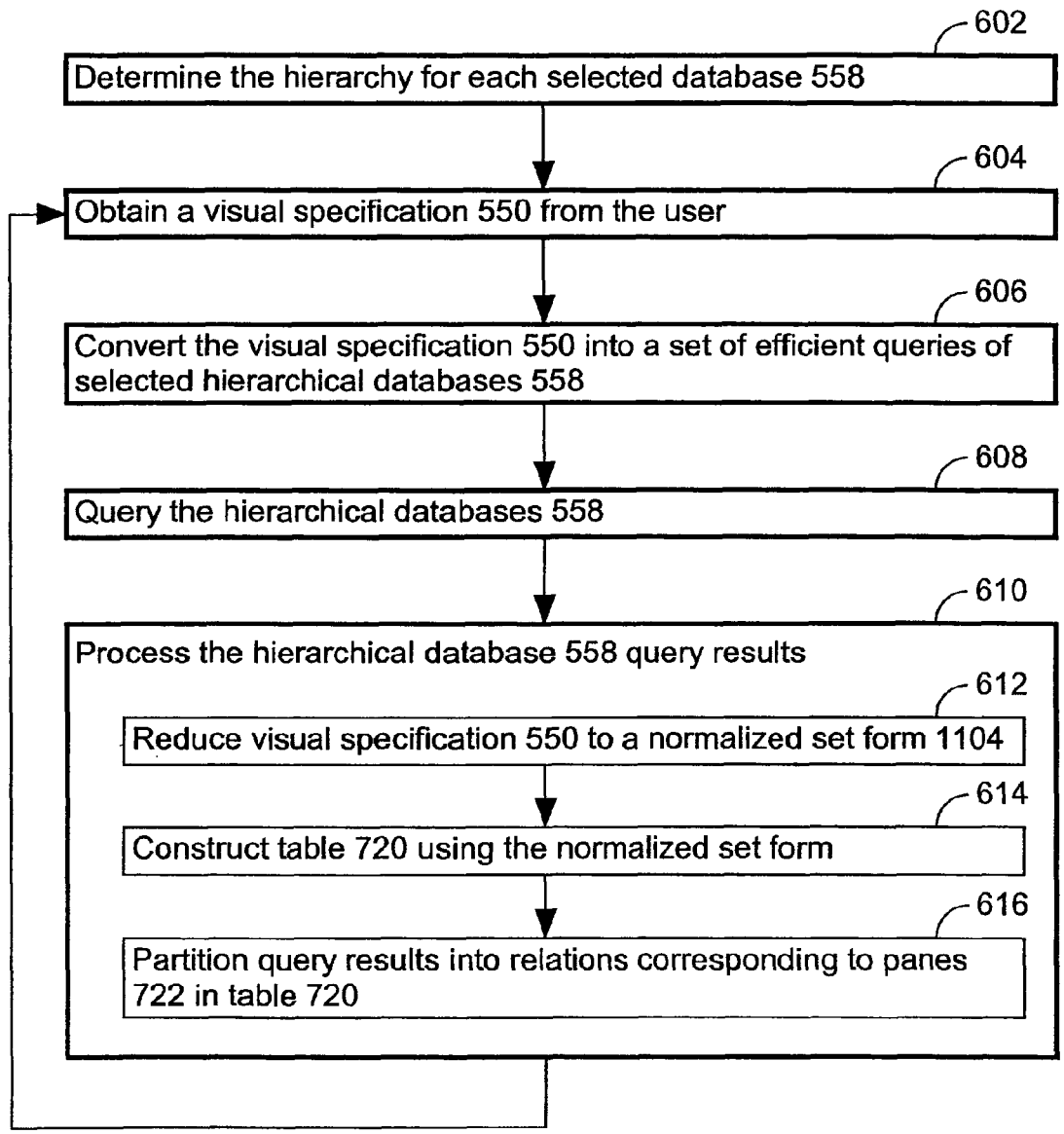
FIG. 7 illustrates processing steps in accordance with one embodiment of the present disclosure.

Referring to FIG. 7, an exemplary method in accordance with one embodiment of the present disclosure is illustrated.

Step 602. In step 602, the hierarchy for each selected database 558 is characterized. In embodiments in which selected databases 558 have a schema 560 that includes such hierarchical information, the schema 560 can be read directly by database hierarchy module 544 and the database hierarchy 562 in this schema 560 can be characterized. Section 5.3 discusses illustrative types of database hierarchy 562 and database organization. In some embodiments, a plurality of databases 558 is analyzed concurrently. In such embodiments, database schema 560 of each of the plurality of databases 558 is read directly by database module 544 and characterized. In some embodiments, selected databases 558 do not have hierarchy that is explicitly defined in the underlying respective databases 558. In such embodiments, database hierarchy module 544 analyses each selected database 558 and constructs database hierarchical information for each of the respective databases. In some instances, this analysis is assisted by input from a user and/or requires an analysis of the data stored in the database.

In some embodiments, the hierarchical structure of a database 558 is derived from a database schema for the database 558. This database schema comprises schema fields. In some embodiments each schema field has a type (e.g., a base type or an array type). Representative base types include, but are not limited to, character strings, integer, short integer, double integer, single precision floating number, double precision floating point number, and object handle. Representative array types include, but are not limited to an array of long integers, an array of short integers, an array of single precision floating point numbers, an array of double precision floating point numbers and an array of object handles.

Figure 8:
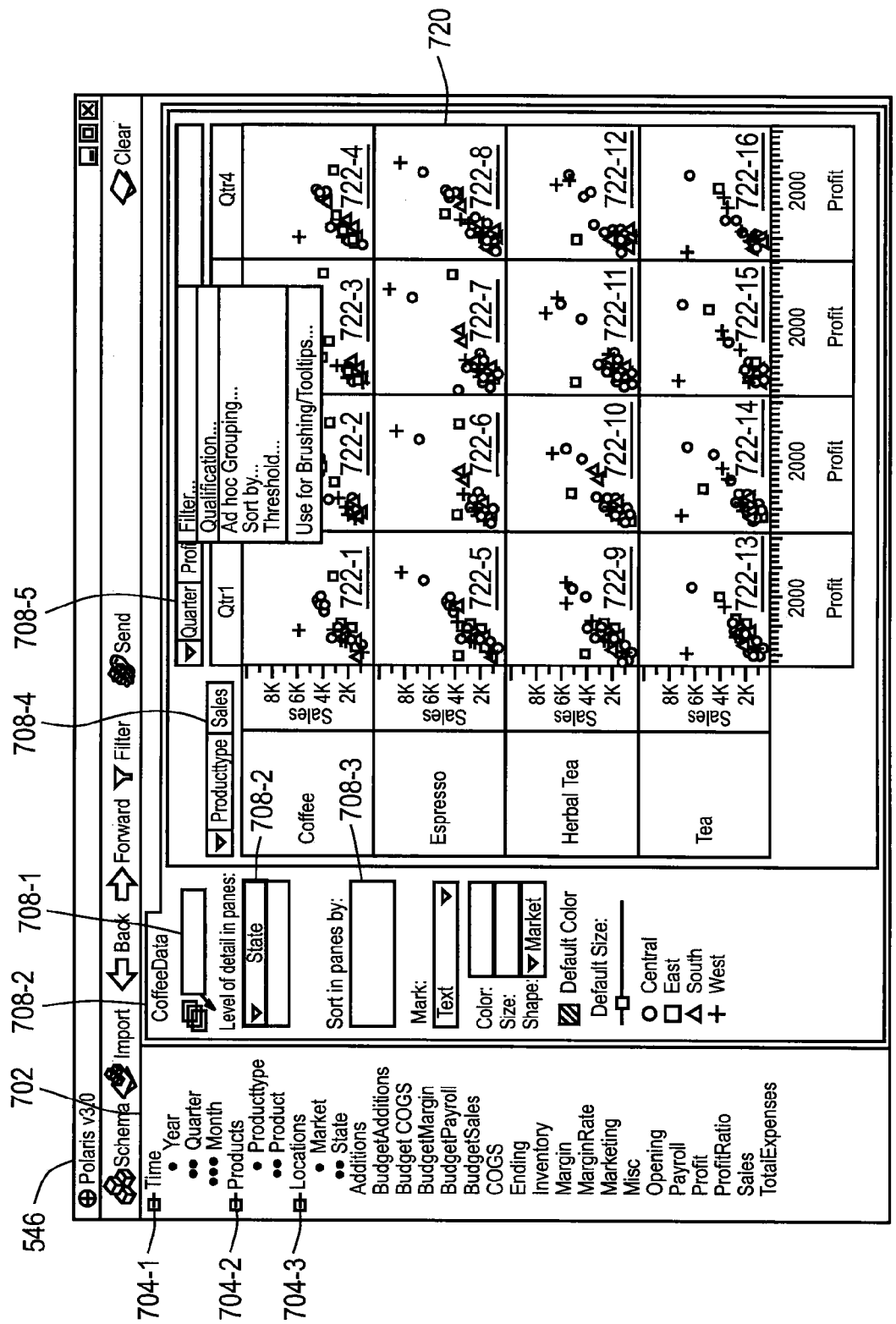
FIG. 8 illustrates a user interface for creating a visual specification in accordance with one embodiment of the present disclosure.

Step 604. In step 604, a visual specification (specification) 550 is obtained from the user by user interface module 546. In a preferred embodiment, visual specification 550 is created using a drag-and-drop interface provided by user interface module 546. An exemplary user interface module 546 is illustrated in FIG. 8. A user creates the visual specification 550 by dragging operand names from schema box 702 to various shelves 708 throughout the interface. These operand names are derived from the hierarchical structure of each selected database 558 that was characterized in step 602. For example, one of the dimensions available for exploration in the database could be "time." Then, likely, operand names available in schema box 702 would be "year", "quarter", "month", and "day". Each of these operand names is referred to as a type tuple. In some embodiments, more than one database 602 is characterized in step 602. Further, specification 550 can comprise a first element of the hierarchical structure of a first database 558 characterized in step 602 and a second element of the hierarchical structure of the second database characterized in step 602. The first element comprises a type tuple that is derived from the first database 558 and the second element comprises a type tuple that is derived from the second database 558.

Schema box 702 of FIG. 8 includes a representation of the database schema for each of the one or more databases 558 being analyzed. Schema box 702 includes each dimension 704 represented in each schema 560 of each database 558 that is being analyzed. For example, in FIG. 8, a single database that includes the dimensions "time" 704-1, "products" 704-2, and "location" 704-3 is analyzed. An ordered list of the dimension's levels is placed below each dimension. For example, in the case of time 704-1, the ordered list includes the dimension levels "year", "quarter", and "month". In the case of products, the ordered list includes the dimension levels "productype" and "product". In the case of location, the ordered list includes the dimension levels "market" and "state".

A user can drop any dimension level into the interface of shelves 708. However, the dimensions 704 cannot be dragged into the shelves. Shelves 708-4 and 708-5 are the axis shelves. The operands placed on shelves 708-4 and 708-5 (e.g., year, quarter, month, productype, product, market, state) determine the structure of visual table 720 and the types of graphs that are placed in each pane 722 of visual table 720. For example, in FIG. 8, the value "sales", which belongs to the dimension "Productype" has been placed on shelf 708-4. Therefore, the y-axis of visual table 720 is a breakdown of the sales of each "productype". Valid product types include "coffee", "espresso", "herbal tea", and "tea." Thus, the y-axis of visual table 720 represents the sale of each of these products. In FIG. 8, the value "profit", which belongs to the operand "Quarter" (which is part of the dimension "time") has been placed on shelf 708-5. Thus, the x-axis of visual table 720 represents profit. Level of detail shelf 708-2 has been set to state. Accordingly, each mark in each pane 722 in visual table 720 represents data for a particular state.

The configuration of operands on shelves 708 (FIG. 8) forms the visual specification 550 (FIG. 6). At a minimum, a visual specification 550 includes an x-axis expression and a y-axis expression. More typically, a visual specification 550 further includes a z-axis expression, which is placed on shelf 708-1, and a level of detail expression 708-2. An exemplary visual specification includes the following expressions:

x:C*(A+B)

y:D+E z:F and the level of detail within each pane 722 is set to:
level of detail: G In some embodiments, a user can specify any of the algebra (e.g., ordinal concatenation, etc.) described in Section 5.4 of copending U.S. patent application Ser. No. 10/453,834, entitled "Computer Systems and Methods for the Query and Visualization of Multidimensional Databases", filed Jun. 2, 2003, which is hereby incorporated by reference in its entirety. In some embodiments, a user types in the algebra directly using a user interface such as the one illustrated in FIG. 8, includes it in a file that is then interpreted, or uses some other form of data entry known in the art.

In some embodiments, the each shelve 708 that represents an axis of visual table 720 is translated into corresponding expressions in an automated manner. For example the contents of the shelf 708 that represents the x-axis is translated into an expression that represents the x-axis of visual table 720, the shelf 708 that represents the y-axis is translated into an expression that represents the y-axis of visual table 720, and the shelf 708 that represents layers is translated into an expression that represents the z-axis of visual table 720. The contents of each axis shelve 708 is an order list of database field names. In some embodiments, the order of the database field names is constrained such that all nominal and ordinal fields precede all quantitative fields in the shelf. Exemplary nominal fields include, but are not limited to products, regions, account numbers or people. Exemplary ordinal fields include, but are not limited to dates or priority rankings. Exemplary quantitative fields include, but are not limited to profit, sales, account balances, speed or frequency. In embodiments where the order of the database field names is constrained such that all nominal and ordinal fields precede all quantitative fields in the shelf 708, the nominal fields are assigned an ordering and treated as ordinal. This ordering is either a natural ordering (e.g., alphabetic, numeric) or an ordering specified by the user. Then, the list of fields in a respective shelf are transformed into an expression of the form $$(O_1 \times O_2 \ldots \times O_n) \times (Q_1 \times Q_2 \ldots \times Q_m)$$

In addition, if any two adjacent categorical fields represent levels of the same dimension then the cross "x" operator (see Section 5.4.2.2 of copending U.S. patent application Ser. No. 10/453,834, entitled "Computer Systems and Methods for the Query and Visualization of Multidimensional Databases", filed Jun. 2, 2003) between them is replaced with a dot "." operator (see Section 5.4.2.4 of copending U.S. patent application Ser. No. 10/453,834, entitled "Computer Systems and Methods for the Query and Visualization of Multidimensional Databases", filed Jun. 2, 2003). The specification is used to map data values from a database 558 to visual properties by visual interpreter module 556. Shelves labeled "Group in panes by" (not shown) and "Sort in panes by" (708-3, FIG. 8) define the "Group" and "Sort Order" components of the visual specification.

In some embodiments, the specification is written in a language that is based on the metadata (e.g., hierarchical structure) of the one or more databases 558 that were characterized in step 602. At a minimum, this language comprises all or a portion of the dimension levels that make up the hierarchies of the one or more databases 558. Examples of dimension levels (e.g., year, quarter, month, etc.) have been described. Typically, these dimensional levels are displayed on user interface 524 as illustrated in FIG. 8. In some embodiments, the language further includes a table algebra, such as the algebra described in Section 5.4 of copending U.S. patent application Ser. No. 10/453,834, entitled "Computer Systems and Methods for the Query and Visualization of Multidimensional Databases", filed Jun. 2, 2003, that allows the user to form complex visual tables comprised of one or more panes 722 (FIG. 8). In embodiments where the specification 550 makes use of the table algebra in the form of an algebraic expression, the specification includes at least one operand. An operand is a dimension level or a measure/quantitative variable from the database schema (or other database metadata) that has been selected for inclusion in the algebraic expression. In addition to the at least one operand, the algebraic expression includes one or more operators that represent operations on the metadata of the one or more databases 558 that were characterized in step 602. Examples of such operators include, but are not limited to, relational operators such as cross product (Section 5.4.2.2 of copending U.S. patent application Ser. No. 10/453,834, entitled "Computer Systems and Methods for the Query and Visualization of Multidimensional Databases", filed Jun. 2, 2003), union, selection or sorting. Other examples of operators include, but are not limited to, the nest operator (Section 5.4.2.3 of copending U.S. patent application Ser. No. 10/453,834, entitled "Computer Systems and Methods for the Query and Visualization of Multidimensional Databases", filed Jun. 2, 2003) and the dot operator (Section 5.4.2.4 of copending U.S. patent application Ser. No. 10/453,834, entitled "Computer Systems and Methods for the Query and Visualization of Multidimensional Databases", filed Jun. 2, 2003). The nest operator analyzes a fact table within a database whereas the dot operator analyses a dimension table (or equivalent data structure) associated with a database 558 that defines the database 558 hierarchy. Analysis of the fact table by the nest operator (Section 5.4.2.3 of copending U.S. patent application Ser. No. 10/453,834, entitled "Computer Systems and Methods for the Query and Visualization of Multidimensional Databases", filed Jun. 2, 2003) or the dimensional table (or equivalent data structure) by the dot operator (Section 5.4.2.4 of copending U.S. patent application Ser. No. 10/453,834, entitled "Computer Systems and Methods for the Query and Visualization of Multidimensional Databases", filed Jun. 2, 2003) represents an operation on the hierarchical structure of the associated database 558. The operations and operators within the algebraic expressions can be nested. For example, in one embodiment, parentheses are used to alter the order in which operators are considered.

In a preferred aspect of the present disclosure, visual specification 550 organizes panes 722 into a plurality of rows and a plurality of columns. In embodiments in accordance with this aspect of the present disclosure, visual specification 550 includes a first algebraic expression for the plurality of rows and a second algebraic expression for the plurality of columns. Both the first algebraic expression and the second algebraic expression each represent an operation on the metadata of a database 558 (e.g., hierarchical structure) that was characterized in step 602. In some instances in accordance with this aspect of the present disclosure, the specification further organizes one or more panes 722 into a plurality of layers. To accomplish this, the specification 550 further comprises a third algebraic expression for the plurality of layers. The third algebraic expression represents an operation on the metadata of one or more of the databases 558 that were characterized in step 602. For example, the first two algebraic expressions could cover revenue for all products whereas the third algebraic expression could add the dimension "State" such that each layer represents the revenue by product for each state.

Using the methods of the present disclosure, each visual specification 550 can be interpreted to determine the exact analysis, query, and drawing operations to be performed by system 500. In a preferred embodiment, drawing operations are performed independently in each pane 722 of visual table 720.

Visual table 720 includes three axes. The x- and y-axes are respectively determined by shelves 708-5 and 708-4, as discussed above. The z-axis is determined by shelf 708-1 (FIG. 8). Each intersection of the x-, y-, and z-axis results in a table pane 722. Each pane 722 contains a set of records, obtained by querying a database 558, that are visually encoded as a set of marks to create a visual table. While shelves 708-1, 708-4, and 708-5 determine the outer layout of visual table 720, other shelves 708 in display 700 determine the layout within a pane 722. In some embodiments, this inner layout includes the sorting and filtering of operands, the mapping of specific databases 558 to specific layers in the z-axis of visual table 720, the grouping of data within a pane 722 and the computation of statistical properties and derived fields, the type of graphic displayed in each pane 722 (e.g., circles, bars, glyphs, etc.), and the mapping of data fields to retinal properties of the marks in the visual tables (e.g., mapping "profit" to the size of the mark and mapping "quarter" to color).

Step 606. In step 606, a set of queries is formed by data interpreter module 552 based on specification 550. Before generating database specific queries, data interpreter module 552 generates a set of one or more abstract query descriptions 554 that describe the required queries using the values specified in visual specification 550 (e.g., values placed on shelves 708-1, 708-4, and 708-5). Query descriptions 554 precisely describe the desired filtering, sorting, and grouping of tuples or objects from database 558. As used here, the term "objects" is a semantic derivation that uses one or more fields form the database. For example, a FAVORITE_CUSTOMERS object can be created from the CUSTOMERS field filtered for PROFIT YIELD>5000 and STATE=CA, WA, or WI.

The number of distinct query descriptions 554 that are generated for a single visual specification 550 is determined by the level of detail specified in visual specification 550 as described in more detail in copending U.S. patent application Ser. No. 10/453,834, entitled "Computer Systems and Methods for the Query and Visualization of Multidimensional Databases", filed Jun. 2, 2003. In some embodiments, the level of detail within a pane 722 in a visual table 720 is determined by both the level of detail shelf 708-2 and the table algebra expressions formed in shelves 708-1, 708-4, and 708-5 (FIG. 8).

Although it is possible for each pane 722 to correspond to a different level of detail, and thus a different query, the common situation is for a larger number of panes 722 (FIG. 8) to correspond to the same level of detail and differ only by how the tuples are filtered. For efficiency, it is preferred to considered panes 722 that require the same level of detail as a group and send a single query to a database 558 requesting the appropriate tuples. The tuples can then be partitioned into panes 722 locally in subsequent processing steps. Accordingly, in one aspect of the present disclosure, database queries are grouped. In some embodiments, this is accomplished by algebraically manipulating visual specification 550 in order to determine the queries that are required for a given visual table 720. Of all the algebraic operators used in the algebra of the present disclosure (see, for example, Section 5.4 of copending U.S. patent application Ser. No. 10/453,834, entitled "Computer Systems and Methods for the Query and Visualization of Multidimensional Databases", filed Jun. 2, 2003), the operator that can produce adjacent panes 722 with differing projections or level of detail is the concatenate operator. Nest, cross, and dot, described in more detail in Section 5.4 of copending U.S. patent application Ser. No. 10/453,834, entitled "Computer Systems and Methods for the Query and Visualization of Multidimensional Databases", filed Jun. 2, 2003, include all input dimension levels in each output p-tuple. Concatenate does not. Thus, if each axis expression in the visual specification 550 is reduced to a sum-of-terms form, the resulting terms will correspond to the set of queries that need to be retrieved from one or more databases 558.

To illustrate the sum-of-terms reduction of each axis, consider exemplary visual specification 550:

$$x: C*(A+B)$$

$$y: D+E$$

$$z: F$$

and the level of detail within each pane 722 is set to G.

Crossing these expressions, in accordance with the table algebra specified in Section 5.4 of copending U.S. patent application Ser. No. 10/453,834, entitled "Computer Systems and Methods for the Query and Visualization of Multidimensional Databases", filed Jun. 2, 2003, and then reducing to a sum-of-terms form yields:

(A*C*D*F*G)+(A*C*E*F*G)+(B*C*D*F*G)+
(B*C*E*G)

Thus, in this example, the following four database queries are made:

(A*C*D*F*G) Query 1
(A*C*E*F*G) Query 2
(B*C*D*F*G) Query 3
(B*C*E*G) Query 4

Most typical multidimensional query languages provide a mechanism for generating queries of the form found in queries 1-4. For example, each of queries 1-4 can be a single multidimensional expressions (MDX) query. MDX (Microsoft, Redmond Wash.), is a syntax that supports the definition and manipulation of multidimensional objects and data. MDX is similar to the structured query language (SQL) syntax, but is not an extension of the SQL language. As with an SQL query, each MDX query requires a data request (SELECT clause), a starting point (FROM clause), and a filter (WHERE clause). These and other keywords provide the tools used to extract specific portions of data from a hierarchical database (e.g., a cube) for analysis. In summary, each query can map to a relational algebra operator such as an SQP query or to a data cube query (e.g., an MDX query).

Now that an overview of how visual specification 550 is reduced to an set of queries has been presented, a detailed algorithm used in one embodiment of the present disclosure will be described. The algorithm is set forth in the following pseudo code:

```
101:    x-terms = List of terms from the sum-of-terms form of the x-axis
        expression
102:    y-terms = List of terms from the sum-of-terms form of the y-axis
        expression
103:    z-terms = List of terms from the sum-of-terms form of the z-axis
        expression
104:    for each layer {
105:        for each x-term in x-terms {
106:            for each y-term in y-terms {
107:                for each z-term in z-terms {
108:                    p-lookup = PaneLookupDescriptor(x-term, y-
                        term, z-term)
109:                    p-spec = The PaneSpecification that applies
                        to p-lookup
110:                    qd = new QueryDescription
111:                    Add to qd all fields in x-term
112:                    Add to qd all fields in y-term
113:                    Add to qd all fields in z-term
114:                    Add to qd all level of detail fields in p-spec
115:                    Add to qd all drawing order fields in p-spec
116:                    Add to qd all encoding fields in p-spec
117:                    Add to qd all selection (brushing/tooltips)
                        fields in p-spec
118:                    Add to qd all filters in the visual specification
                        involving the fields in qd
119:                    if (qd matches data in data-cache)
120:                        results = retrieve data from data-cache
121:                    else
122:                        results = retrieve data from database server
123:                        add results to data-cache indexed by qd
124:                    group-tsf = create GroupingTransform
125:                    run group-tsf
126:                    Add each output data structure from group-tsf
                        to pane-data-cache } } } }
```

Lines 101 through 103 of the pseudo code represent the case in which each axis of visual specification 550 is reduced to the sum-of-terms. Then, lines 104 through 107 are used to individually consider each of the terms i. Individually, each term i describes either a set of rows, a set of columns, or a set of layers in visual table 720. Together, the terms define a set of panes 722 that are all at the same level of detail 708-6 (FIG.

7). Thus, lines 104 through 107 can be read as "for each x-term, y-term, z-term combination".

Lines 108 and 109 are used to find the pane specification, which defines the marks, encodings, etc., for the panes 722 defined by a particular x-term, y-term, z-term combination. This is done by testing p-lookup against the selection criteria predicate in each pane specification in the visual specification.

Lines 110 through 118 build a query for the particular x-term, y-term, z-term combination. Line 110 creates the variable "qd" to hold the query and lines 111 through 113 adds all the fields in the x-term, the y-term, and the z-term in the particular x-term, y-term, z-term combination. Lines 114 through 118 add additional terms from visual specification 550, such as level of detail, to the query.

Next, in lines 119 through 122, a determination is made as to whether a query of the form built by lines 110 through 118 already exists in the data-cache (query cache 555, FIG. 6). If so, the result is retrieve from the data cache (line 120, from query cache 555, FIG. 6). If not, the server that hosts the target database 558 is queried (line 122) using the query built by lines 110 through 118. If such a database query is made, data interpreter module 552 will formulate the query in a database-specific manner. For example, in certain instances, data interpreter module 552 will formulate an SQL query whereas in other instances, data interpreter module 552 will formulate an MDX query. In line 123, the results of the query is added to the data-cache (to query cache 555, FIG. 6).

The data retrieved in the processing steps above can contain data for a set of panes 722. When this is the case, the data is partitioned into a separate data structure for each pane 722 using a grouping transform (lines 124-125) that is conceptually the same as a "GROUP BY" in SQL except separate data structures are created for each group rather than performing aggregation. In line 126, each output data structure from group-tsf is added to pane-data-cache 557 (FIG. 6) for later use by visual interpreter module 556.

Step 608. In step 608, the queries developed in step 606 are used to query one or more databases 558. Such databases 558 can be stored in memory 548. However, in a more preferred embodiment, these databases 558 are stored in a remote server.

Step 610. In step 610, visual interpreter module 556 processes queries that have been generated by data interpreter module 552. A number of steps are performed in order to process these queries. An overview of these steps is illustrated in FIG. 9. In step 612, visual specification 550 is reduced to a normalized set form 1104. In step 614, visual table 720 is constructed using the normalized set form. In step 616, the query results are partitioned into tuples corresponding to the panes 722 in visual table 720. Each of these steps will now be described in further detail so that the advantages of the present disclosure can be appreciated.

Step 612—reduction of the visual specification to the normalized set form. In step 604, visual specification 550 was obtained by user interface module 546. The visual specification 550 comprises the values of shelves 708 that have been populated by the user. In step 612, visual specification 550 is used to construct algebraic expressions that define how visual table 720 is partitioned into rows, columns, and layers, and additionally defines the spatial encodings within each pane 722 of visual table 720. In this way, visual specification 550 organizes one or more panes 722 into a plurality of rows and a plurality of columns. In some embodiments, the plurality of rows and plurality of columns is hierarchically organized. Further, in some embodiments specification 550 also organizes the one or more panes 722 into a plurality of layers that are optionally hierarchically organized. Further still, in some embodiments, the specification organizes the one or more panes 722 into separate pages that are optionally hierarchically organized.

A complete algebraic expression of visual table 720 is termed a "table configuration." In other words, in step 612, the three separate expressions of visual specification 550 that respectively define the x, y, and z axes of visual table 720 are normalized to set form (set interpreted) in order to partition the row, columns and layers of visual table 720. To produce the normalized set form, each operand in the three separate expressions is evaluated to set form. The operators in each expression define how to evaluate each set within an expression. Thus, normalization to set form results in a single set (the normalized set form), where each element in the normalized set form corresponds to a single row, column, or layer of visual table 720. In some embodiments, this normalization process is extended to yet another dimension, terms "pages".

Recall that each expression in the three separate expressions of visual specification 550 that define the x, y, and z axis are drawn from operands (e.g., fields) in the database schema. The algebra used to produce the normalized set form characterizes each of the operands in a database schema (or some other representation of database structure) into two types: dimension levels and measure. Whether an operand is a dimensional level or a measure depends on the type of the operand. The set interpretation of an operand consists of the members of the order domain of the operand. The set interpretation of the measure operand is a single-element set containing the operand name. For example, the set interpretation of the "Profit" operand is {Profit}.

The assignment of sets to the different types of operands reflects the difference in how the two types of operands are encoded into the structure of visual table 720. Dimensional level operands partition the table into rows and columns, whereas measure operands are spatially encoded as axes within table panes. A valid expression in the algebra used in the present disclosure is an ordered sequence of one or more operands with operators between each pair of adjacent operands. The operators in this algebra, in order of precedence are cross (x), nest (/), and concatenation (+). Parentheses can be used to alter the precedence. Because each operand is interpreted as an ordered set, the precise semantics of each operator is defined in terms of how they combine two sets (one each from the left and right operands) into a single set.

Thus, every expression in visual specification 550 can be reduced to a single set, with each entry in the set being an ordered concatenation of zero or more dimension level values followed by zero or more measure operand names. For example, the normalized set form of the expression "month× profit" is {(January, Profit), (February, Profit), . . . , (December, Profit)}. The normalized set form of an expression determines one axis of visual table 720. The table axis is partitioned into columns (or rows or layers) so that there is a one-to-one correspondence between columns and entries in the normalized set.

Now that an overview of step 612 has been described, an example will be given. Consider the exemplary visual specification 550 of FIG. 9:

x:C*(A+B)

y:D+E z:F

Computation of the normalized set form of this visual specification, in accordance with step 612 provides:

x:$\{(c_1,a_1) \ldots (c_k,b_j)\}$ y:$\{(d_1), \ldots, (d_1),(e_1), \ldots, (e_m)\}$ z:$\{(f_1), \ldots (f_n)\}$ Advantageously, the algebraic formalisms of the present disclosure can make use of an operator, termed the dot operator, that is specifically designed to work with dimension levels. Thus, the algebraic formalisms provide direct support for the use and exploration of database hierarchy in the present disclosure. One of the advantages of the dot operator is that it can deduce hierarchical information without analyzing database fact tables.

Step 614—construction of visual table 720 using the normalized set form. In step 614 (FIG. 7, FIG. 9), visual interpreter 556 constructs visual table 720 using the normalized set form of the expressions for the x, y, and z-axis obtained from visual specification 550. Each element in the normalized set form of the expressions for the x, y, and z-axis corresponds to a single row, column or layer.

FIG. 10 illustrates the configuration for a visual table 720 that has been generated from the normalized set form of a visual specification. FIG. 10 displays Profit information for the coffee chain data set (COFFEE). The y-axis is defined by the expression Profit+(Market×ProductType) and the x-axis is defined by the expression (Quarter/Month). The z-axis is not illustrated in FIG. 10.

As illustrated in FIG. 10, expressions 1202 and 1204 are composed of operands connected by operators. Each operand is evaluated to a mathematical sequence of p-tuples (the set interpretation). A mathematical sequence is an ordered list of elements that allows duplicate members. The operators between each operand define how to combine two sequences. Thus, each expression can be interpreted as a single sequence (the normalized set form), where each element in the sequence corresponds to a single row, column, or layer.

In some embodiments, the normalized set form generated in step 612 is more formally defined as p-entries and p-tuples. The set interpretation of an operand is a finite (possibly empty) sequence of heterogeneous p-tuples. Each p-tuple in a set interpretation defines a row (or column or layer) of visual table 720. In other words, each p-tuple maps to a row, a column, or a layer in visual table 720. A p-tuple is a finite sequence of p-entries. A single p-tuple defines a single row (or column or layer). The entries of a p-tuple define the spatial encoding (axis) within the row and the selection criteria on the fact table of a database 558. A p-entry is an ordered "tag-value" pair where the tag defines the meaning and possible values of the value member of the pair. A p-entry will be written as tag:value; e.g., field:Profit. A tag can be a field, constant, or field name, as discussed in further detail in Section 5.4 copending U.S. application Ser. No. 10/453,834, entitled "Computer Systems and Methods for the Query and Visualization of Multidimensional Databases", attorney docket number 11311-004-999, filed Jun. 2, 2003. In some embodiments, the panes 722 of the row, column, or layer to which an ordered set of tuples (p-tuple) is mapped are ordered within the row, column, or layer in visual table 720 in the same order that is presented in the p-tuple.

In summary, each axis of visual table 720 is defined by an expression from visual specification 550 that has been rewritten in normalized set form. The cardinality of this normalized set determines the number of rows (or columns or layers) along the axis, with the exception of when the normalized set is the empty sequence. In a preferred embodiment, when the normalized set is an empty sequence, a single row or column is created rather than zero rows or columns. Each p-tuple within the normalized set defines a row (or column or layer). The p-entries within each p-tuple define both a selection criterion on the database 558 fact table, selecting tuples to be displayed in the row, and the spatial encoding in the row, defining the positions of the graphical marks used to visualize the database tuples.

In some embodiments visual table 720 is presented as a web interface. In some embodiments, all or portions of user interface module 546 are run and displayed on a remote user computer in order to facilitate the presentation of visual table 720 as a web interface.

Step 616—partition query results into tuples corresponding to panes 722 in visual table 720. In step 616 (FIG. 7, FIG. 9) visual interpreter module 556 processes query results that are returned by data interpreter module 552. These query results are referred to as tuples. In some embodiments of the present disclosure visual interpreter module 556 performs the following algorithm:

```
201:    x-set = compute normalized set form of x-axis expression
202:    y-set = compute normalized set form of y-axis expression
203:    z-set = compute normalized set form of z-axis expression
204:    for each x-entry in x-set {
205:        for each y-entry in y-set {
206:            for each z-entry in z-set {
207:                p-lookup = new PaneLookupDescriptor(x-entry, y-
                        entry, z-entry)
208:                p-spec = The PaneSpecification that applies to p-
                        lookup
209:                create the pane graphic
210:                create the primitive object for rendering tuples
211:                create the encoding objects for the visual properties
                        and add to primitive
212:                create the per-pane transform that sorts tuples into
                        drawing order
213:                retrieve the data from the pane-data-cache using p-
                        lookup
214:                bind the data from the pane-data-cache using
                        p-lookup
215:                bind the pane to the data } } }
```

Lines 201 through 203 are performed in step 612 (FIG. 7). Lines 204 through 206 are a triple "for" loop to individual consider each pane 722 in visual table 720. For each pane i, lines 207-214 are performed.

In lines 207 and 208, the pane specification for pane i is located. The pane specification is ultimately derived from visual specification 550. The pane specification for pane i defines the mark, encodings, etc., for the pane.

In lines 209-212, the pane graphic of pane i is created using the pane specification that applies to pane i. In line 210, primitive objects for rendering tuples within pane i is created. An example of a pane primitive object is a bar in a bar chart. In line 211, the encoding objects for the visual properties of each respective primitive object created in line 210 are created and added to the corresponding primitive objects. Exemplary encoding objects in the case of a bar are color and size of the bar. In line 212, the per-pane transform that sorts tuples into drawing order is applied. In other words, the per-pane transform is used to describe how tuples will be displayed in pane i.

In line 213, the data for pane i is retrieved from pane-data-cache 557 using p-lookup. In lines 214-215, the data (e.g., a subset of the set of tuples that were retrieved from a query of database 558) for pane i is bound to pane i. In this way, data from a query of database 558 is bound to visual table 720 by visual interpreter module 556.

In other words, in lines 209-212 a tuple in a subset of tuples associated with pane i is encoded as a graphical mark. In some instances the tuple in the subset of tuples comprises a field that is then mapped to a graphical attribute (e.g., a color, a value, a size, a shape, a phrase, or a symbol). In some embodiments the field is classified as quantitative or ordinal and (i) when the field is classified as quantitative, it is mapped to a first graphical attribute and (ii) when the field is classified as ordinal it is mapped to a second graphical attribute. In some embodiments the field is classified as independent or dependent and (i) when the field is classified as independent, it is mapped to a first graphical attribute and (ii) when the field is classified as dependent it is mapped to a second graphical attribute. The first and second attribute are each independently a color, a value, a size, a shape, a phrase or a symbol.

In some embodiments, the subset of tuples associated with pane i is determined by a selection function. In some embodiments, the selection function uses an identity of a schema field that is present in the metadata of the database 558 characterized in step 602 to form the subset of tuples. For example, the specification may assign all tuples that belong to a specific schema field type to pane i. In some embodiments, the selection function uses a relational operator (e.g., a selection operator or a grouping operator) to form the subset of tuples associated with pane i. Further, the ordering of rows and columns in visual table 720 can be controlled and filtered as well.

The algorithm described in lines 201 through 215 assumes that each query of 558 is available in a pane-data-cache 557. Recall that an important advantage of the present disclosure is that queries are typically grouped across several panes. Thus, queries need to be partitioned into a separate table for each pane and then placed in the pane-data-cache 557. While the present disclosure imposes no limitation on which software module performs this grouping transformation, in one embodiment of the present disclosure, the grouping transformation is performed by data interpreter module 552 as part of a generalized algorithm for querying databases 558. See, for example, the algorithm described in step 606, above.

In some embodiments of the present disclosure, step 608 returns a set of tuples. Next, in step 610 a new tuple is derived from the set of tuples. This new tuple is then incorporated into the set of tuples for possible association with one or more panes 722 in the graphic that is specified by visual specification 550. In some instances a relational operator (e.g., a sorting operator, an aggregation operator, or a transforming operator) is used to create the new tuple. An example of this is an additional transformation that is performed to augment the query language. For example, it is known that an MDX query can easily aggregate all twelve months of a year into year total and then, say, aggregate multiple years into a multi-year total because this aggregation occurs up and down the hierarchy. But MDX cannot easily aggregate across a hierarchy (e.g., the totals for all Januaries regardless of the year). The present disclosure allows for aggregation across a hierarchy by applying one or more local transformations to a set of returned tuples (e.g., a set of tuples returned from one or more MDX queries). For example, in order to obtain totals for all Januaries regardless of year, one or more MDX queries are made to obtain the relevant tuples and then the month of January is aggregated across respective years in the MDX query results.

In some embodiments of the present disclosure, step 608 returns a set of tuples. A group is formed using all or a portion of the tuples in the set of tuples. Then a graphic based on the group is formed. Such embodiments are useful in instances where a multi-pane graphic is constructed. Examples of such graphics include a line that connects each tuple in a group or an area that encloses each tuple in the group.

In some embodiments, specification 550 organizes one or more panes 722 into a plurality of layers and each layer in the plurality of layers is assigned a tuple from a different database 558 that was characterized in step 602. In some embodiments, the specification 550 organizes one or more panes 722 into a plurality of columns and a plurality of rows and each column in the plurality of columns is assigned a tuple from a different database 558 that was characterized in step 602. In still other embodiments, the specification organizes the one or more panes into a plurality of columns and a plurality of rows and each row in the plurality of rows is assigned to a tuple from a different database 558 that was characterized in step 602. In still further embodiments, the specification organizes the one or more panes into a plurality of pages and each page in the plurality of pages is assigned to a tuple from a different database 558 that was characterized in step 602.

An overview of the steps performed in accordance with one embodiment of the present disclosure has been provided. The present disclosure is highly advantageous because it takes advantage of the underlying hierarchy of one or more target database 558 in order to allow a user to more efficiently explore databases 558. A user can rapidly drill down hierarchical layers within each target database 558. For example, in one embodiment of the present disclosure, the interface includes a "♥" icon 708-6 (FIG. 7). When the user presses the "♥" icon 708-6, the user is presented with a listing of all the levels of the dimension (including diverging levels in complex dimensional hierarchies in the target databases). When a new level is selected, this is interpreted as a drill down (or roll up) operation along that dimension and the current level is automatically replaced with the selected level (with the same qualification). Thus, the present disclosure allows the user to rapidly move between different levels of detail along a dimension, refining the visual specification 550 as the user navigates. At each level, the present disclosure forms efficient database queries using the novel table algebra of the present disclosure. Another advantage of the present disclosure is that a subset of tuples associated with a pane in step 616 can be used as a visual specification 550 in a new iteration of steps 605 through 616. For example, the user can select one or more tuples in the subset of the tuples associated with the pane as a basis for a new specification. Then, steps 606 through 616 can be repeated using the new specification. Still another advantage of the present disclosure is that each specification 550 can be expressed in a form that can be stored for later usage. Storage of specifications 550 allow for services such as the bookmarking of favored specifications as well as support for specification "undo" and "redo". In a specification "undo", for example, the specification 550 that was used in a previous instance of step 604 is obtained and used to perform steps 606 through 616.

5.3 Illustrative Types of Database Hierarchy and Database Organization

The present disclosure provides visualization techniques for the exploration and analysis of multidimensional analytic data stored in databases 558. One form of databases 558 is a data warehouse. Data warehouses are typically structured as either relational databases or multidimensional data cubes. In this section, aspects of relational databases and multidimensional data cubes that are relevant to the present disclosure are described. For more information on relational databases and multidimensional data cubes, see Berson and Smith, 1997, Data Warehousing, Data Mining and OLAP, McGraw-Hill, New York; Freeze, 2000, Unlocking OLAP with Microsoft SQL Server and Excel 2000, IDG Books Worldwide, Inc., Foster City, Calif.; and Thomson, 1997, OLAP Solutions: Building Multidimensional Information Systems, Wiley Computer Publishing, New York. In addition, it will be appreciated that in some embodiments database 558 does not have a formal hierarchical structure. In such embodiments, hierarchical structure for the database is derived by analyzing the database using user interface module 544.

5.3.1 Data Organization

Databases have typically been used for operational purposes (OLTP), such as order entry, accounting and inventory control. More recently, corporations and scientific projects have been building databases, called data warehouses or large on-line analytical processing (OLAP) databases, explicitly for the purposes of exploration and analysis. The "data warehouse" can be described as a subject-oriented, integrated, time-variant, nonvolatile collection of data in support of management decisions. The key aspect of the data warehouse is that it is a repository for analytic data rather than transactional or operational data. The data contained in the data warehouse usually represents historical data, e.g., transactions over time, about some key interest of the business or project. This data is typically collected from many different sources such as operational databases, simulations, data collection tools (e.g., tqdump), and other external sources.

Data warehouses are built using both relational databases and specialized multidimensional structures called data cubes. In this subsection, the organization of the data within these databases, such as the database schemas, the use of semantic hierarchies, and the structure of data cubes, is explained. In the next subsection, the difference between the organization of OLAP databases and OLTP databases is described.

5.3.2 Relational Databases

Relational databases organize data into tables where each row corresponds to a basic entity or fact and each column represents a property of that entity. For example, a table may represent transactions in a bank, where each row corresponds to a single transaction, and each transaction has multiple attributes, such as the transaction amount, the account balance, the bank branch, and the customer. The table is referred to as a relation, a row as a tuple, and a column as an attribute or field. The attributes within a relation can be partitioned into two types: dimensions and measures. Dimensions and measures are similar to independent and dependent variables in traditional analysis. For example, the bank branch and the customer would be dimensions, while the account balance would be a measure. A single relational database will often describe many heterogeneous but interrelated entities. For example, a database designed for a coffee chain might maintain information about employees, products, and sales. The database schema defines the relations (tables) in a database, the relationships between those relations, and how the relations model the entities of interest.

5.3.3 Hierarchical Structure

Figure 1:
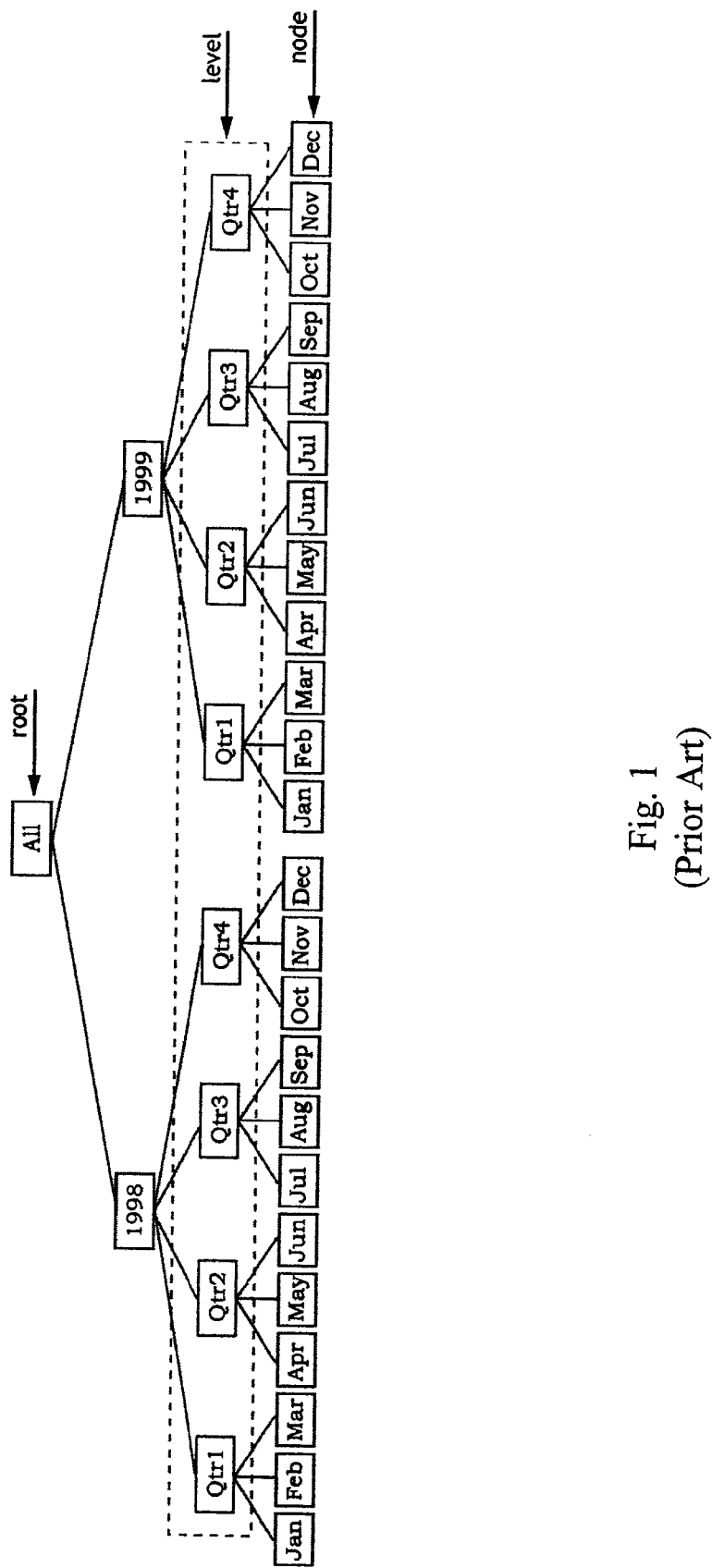
FIG. 1 illustrates a hierarchy for time in accordance with the prior art.
Figure 4:
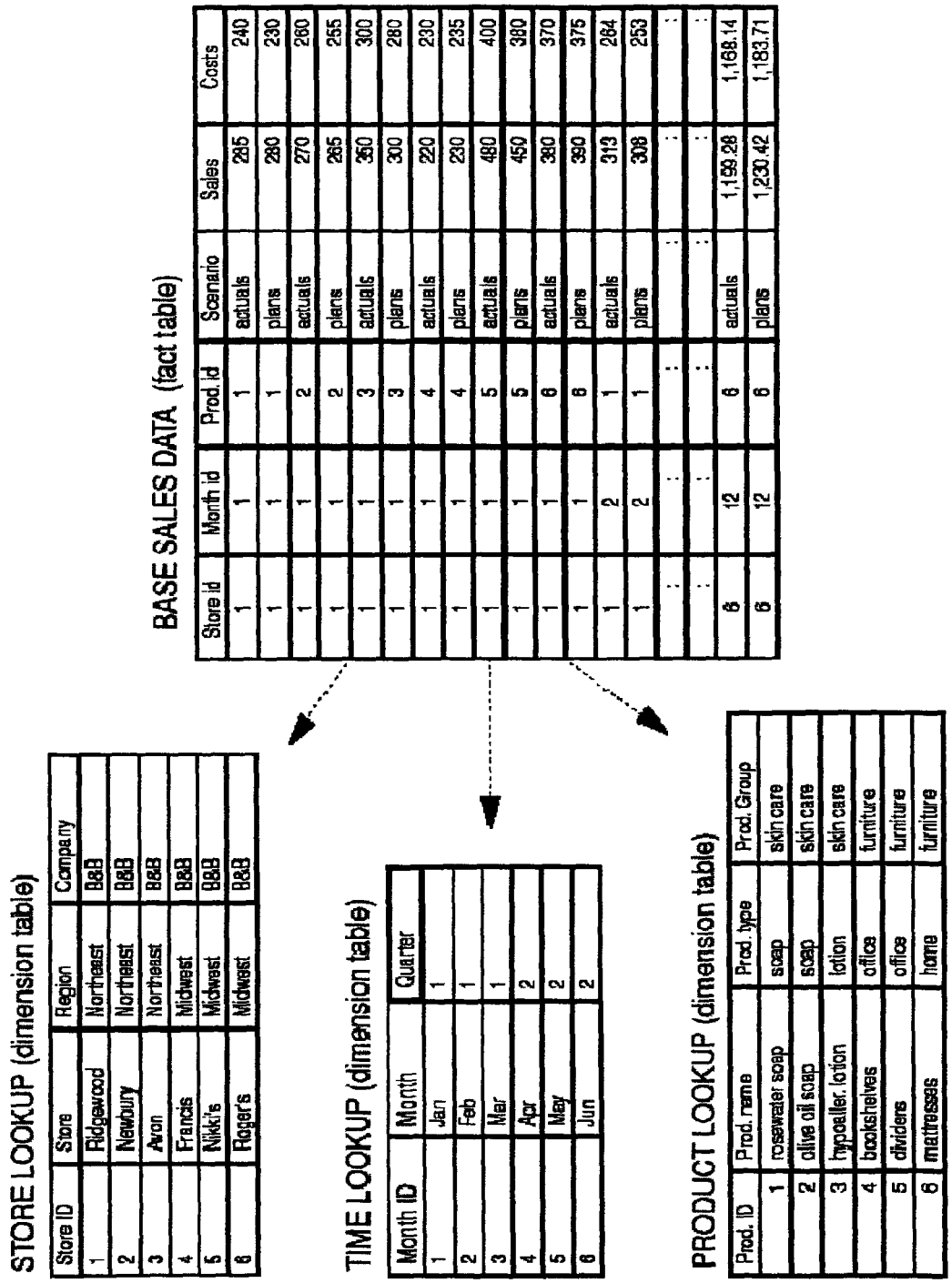
FIG. 4 illustrates a star schema for a database in accordance with the prior art.

Most dimensions in a databases have a hierarchical structure. This hierarchical structure can be derived from the semantic levels of detail within the dimension or generated from classification algorithms. The systems and methods of the present disclosure use these hierarchies to provide tools that an analyst can use to explore and analyze data at multiple levels of detail calculated from the fact table. For example, rather than having a single dimension "state", a hierarchical dimension "location" that has three levels, one each for country, state, and county, can be used. Then, the analyst can aggregate the measures of interest to any of these levels. The aggregation levels are determined from the hierarchical dimension, which is structured as a tree with multiple levels. The highest level is the most aggregated and the lowest level is the least aggregated. Each level corresponds to a different semantic level of detail for that dimension. Within each level of the tree, there are many nodes, with each node corresponding to a value within the domain of that level of detail of that dimension. The tree forms a set of parent-child relationships between the domain values at each level of detail. These relationships are the basis for aggregation, drill down, and roll up operations within the dimension hierarchy. FIG. 1 illustrates the dimension hierarchy for a Time dimension. Simple hierarchies, like the one shown in FIG. 1, are commonly modeled using a star schema. The entire dimensional hierarchy is represented by a single dimension table. In this type of hierarchy, there is only one path of aggregation. However, there are more complex dimension hierarchies in which the aggregation path can branch. For example, a time dimension might aggregate from Day to both Week and Month. These complex hierarchies are typically represented using the snowflake schema, as described in Section 2, which uses multiple relations (tables) to represent the diverging hierarchies.

5.3.4 Data Cubes

A data warehouse can be constructed as a relational database using either a star or snowflake schema and will provide a conceptual model of a multidimensional data set. However, the typical analysis operations such as summaries and aggregations are not well supported by the relational model. The queries are difficult to write in languages such as SQL and the query performance is not ideal. As a result, typically, the fact tables and dimension tables are not used directly for analysis but rather as a basis from which to construct a multidimensional database called a data cube.

Each axis in the data cube corresponds to a dimension in the relational schema and consists of every possible value for that dimension. For example, an axis corresponding to states would have fifty values, one for each state. Each cell in the data cube corresponds to a unique combination of values for the dimensions. For example, if there are two dimensions, "State" and "Product", then there would be a cell for every unique combination of the two, e.g., one cell each for (California, Tea), (California, Coffee), (Florida, Tea), (Florida, Coffee), etc. Each cell contains one value per measure of the data cube. So if product production and consumption information is needed, then each cell would contain two values, one for the number of products of each type consumed in that state, and one for the number of products of each type produced in that state. FIG. 11 illustrates a data cube for a hypothetical nationwide coffee chain data warehouse. Each cell in the data cube summarizes all measures in the base fact table for the corresponding values in each dimension.

Dimensions within the data warehouse are often augmented with a hierarchical structure. The systems and methods of the present disclosure use these hierarchies to provide tools that can be used to explore and analyze the data cube at multiple meaningful levels of aggregation. Each cell in the data cube then corresponds to the measures of the base fact table aggregated to the proper level of detail. If each dimension has a hierarchical structure, then the data warehouse is not a single data cube but rather a lattice of data cubes, where each cube is defined by the combination of a level of detail for each dimension (FIG. 12). In FIG. 12, the hierarchical structure of each dimension (time, product, location) defines the lattice of cubes. Within the lattice, each cube is defined by the combination of a level of detail for each dimension. The cubes at the bottom of the lattice contain the most detailed information whereas the cubes at the top of the lattice are the most abstract.

5.3.5 OLAP Versus OLTP

The previous section described how both relational databases and data cubes could be organized and used for analytical purposes (OLAP). Traditionally, however, relational databases have been used for day-to-day operational purposes. These OLTP databases address different issues than OLAP databases or data warehouses and, as a result, have schemas and usage patterns that are quite different. It is necessary to understand the differences between these two types of databases in order to understand the issues affecting the design of OLAP visualization tools.

OLTP databases are optimized for performance when processing short transactions to either query or modify data, possibly interfacing with more then one system and supporting many simultaneous connections. Furthermore, query performance is typically secondary to issues like avoiding data redundancy and supporting updates. Typical OLTP queries retrieve a few dozen tuples from only a few relations and then update some of the tuples. For example, a typical query might retrieve a single customer's record based on their account number, or add a single transaction to a sales relation when a sale occurs. Database schema definitions for operational databases focus on maximizing concurrency and optimizing insert, update, and delete performance. As a result, the schema is often normalized, resulting in a database with many relations, each describing a distinct entity set.

In contrast, rather than being used to maintain updateable transaction data, users need to be able to interactively query and explore OLAP databases. The queries for OLAP are very different in that they typically retrieve thousands of rows of information and modify none of them. The queries are large, complex, ad hoc, and data-intensive. Because an operational schema separates the underlying data into many relations, executing these analytical queries on a database based on an operational schema would require many expensive join computations. Since analysis databases are typically read-only, and because query performance is the primary concern, OLAP databases sacrifice redundancy and update performance to accelerate queries, typically by denormalizing the database into a very small number of relations using a star or snowflake schema. External tools can typically view an OLAP database as either a data cube or a single large relation (table).

5.3.6 Multidimensional Analysis Operations

In some embodiments database 558 is typically quite large, comprising many dimensions each with hierarchical structure and often many members. To navigate the resulting lattice of data cubes and perform dimensional reduction to extract data for analysis, there are a number of multidimensional analysis operations that are used. This section describes such operations.

Drill down refers to the process of navigating through the lattice of data cubes in the direction of more detail. It is the technique used to break one piece of information into smaller and more detailed parts. Roll up is the inverse of drill down, aggregating detailed data into coarser elements. Projection (illustrated in FIG. 13) reduces the dimensionality of an n-dimensional data cube to (n−1) by aggregating across a dimension. For example, in FIG. 13, the first projection summarizes across "Location", reducing the 3-dimensional cube to a 2-dimensional cube.

Where projection reduces dimensionality via aggregation, slicing (illustrated in FIG. 14) reduces dimensionality by filtering a dimension to a single value. In other words, one dimension is held constant to generate a slice across that dimension. In the example illustrated in FIG. 14, a two-dimensional slice corresponding to data for "Qtr 2" has been taken from the "Time" dimension.

5.3.7 Data Characterization for Visualization

Having described how the OLAP data used by some embodiments of the present disclosure is organized, additional data characterization used to support some visualization processes of the present disclosure is now presented. For the purposes of visualization, more about an attribute than is usually captured by a database system is needed. Databases typically provide limited information about a field, such as its name, whether a field is a dimension or measure, and its type (e.g., time, integer, float, character).

In some embodiments of the present disclosure, a determination is made as to whether a database field (operand) is nominal, ordinal, or quantitative in order to determine how to encode the field in a visual table using visual properties. Representative visual properties include, but are not limited to, color, size, or position. This includes regular black text appearing in tables like Pivot Tables. This characterization is based on a simplification of Stevens' scales of measurement. See Stevens, 1946, Science 103, pp. 677-680. In some embodiments, this characterization is further simplified depending on if the context emphasizes the difference between discrete data and continuous data or if the context emphasizes whether the field has an ordering. In one example, when encoding a field spatially, the emphasis is on whether a field has discrete values. Furthermore, when a field is assigned to an axis, it has an ordering. Thus, in this context, nominal fields that do not normally have an ordering are assigned one and then treated as an ordinal field in some embodiments of the present disclosure. The resulting characterization is called categorical. In contrast, when assigning visual properties such as color to a field, the important distinguishing characterization is order. In this context, the ordinal and quantitative fields are treated as a single characterization and nominal fields are considered separately, in some embodiments of the present disclosure. In addition, attributes have associated units and semantic domains. For example, attributes can encode time, geographic units such as latitude, or physical measurements. If this information is available, it can also be used to generate more effective visual encodings and aid in determining the geometry (e.g., aspect ratio) of a visual table 720. For example, knowing that the x and y axis of a visual table 720 correspond to latitude and longitude, rather than profit and sales, will affect the determination of the appropriate geometry.

Databases also typically only store the current domain of a field (e.g., the values that currently exist within the database) without any ordering. However, for analysis it is important to understand the actual domain of a field, such as the possible values and their inherent (if applicable) ordering. To encode an attribute as an axis of a visual table 720, all possible values and their ordering need Ser. No. 10/453,834 so that an indication of when data is missing can be made and to present data within its semantic context rather than using some arbitrary ordering, e.g., alphabetic. In some embodiments, this additional data characterization is captured in an attribute file 580 (e.g., an XML document) that is associated with database 558 (FIG. 6).

5.3.8 Layers

In the present disclosure a layer in a visual table 720 is a single x-y table whose structure is defined by the x- and y-axes expressions. Every layer in a specification is composited together back-to-front to form the final visualization. A single visualization can combine multiple data sources. Each data source is mapped to a distinct layer or set of layers. While all data sources and layers share the same configuration for the x- and y-axes of the table, each data source can have a different expression (the z-axis) for partitioning its data into layers. Layering of multiple data sources and the partitioning of layers is illustrated in FIG. 15. In some embodiments of the present disclosure, each data source in a visualization is mapped to a distinct layer. The layers for a data source can be partitioned into additional layers by the z-axis expression for that data source. All the layers in a specification are composited together back-to-front to form the final visualization.

Constant operands are an important aspect of layering. A single visualization can be composed of multiple heterogeneous databases 558, each mapped to a distinct layer, and all layers must share the same expressions for the x- and y-axes. However, sometimes it is desirable to include ordinal fields in the x- and y-axes expressions that exist in only a subset of the visualized databases. When this occurs, constant operands are generated for the other layers with a predefined set interpretation that matches the domain of the ordinal field in the layer in which the field does appear, Thus, the expressions can be properly evaluated for each layer.

The z-axis expression for a data source is more constrained than the expressions for the x and y-axes. Specifically, since layering must be discrete, a z-axis expression can contain only ordinal operands; not quantitative operands. In other words, a z-axis expression is constrained to the Oexpr, production rule in the grammar of the present disclosure.

5.3.9 Conceptual Data Flow

At this point, it is useful to consider the conceptual data flow in accordance with one embodiment of the present disclosure. As well as defining visual table 720 structure, the algebraic expressions of the visual specification (formed on shelves 708-1, 708-4, and 708-5) define which tuples of the database 558 should be selected and mapped into each pane 722. When a specification is interpreted, one or more queries are generated to retrieve tuples from the database (FIG. 7, step 608; FIG. 16, step 1802). The resulting tuples are partitioned into layers and panes (FIG. 16, step 1804). Then, tuples within each pane are grouped, sorted and aggregated (FIG. 16, step 1806). Once the tuples have been sorted into panes 722, they are then mapped to graphic marks to generate a perceivable display (FIG. 16, step 1808).

5.4 Spreading a Dimension Across Multiple Axes

Another aspect of the present disclosure provides a method of forming a visual plot. In some embodiments, the visual plot is a visual graph 720. In other methods it is a visual text plot (not shown). In both embodiments, the hierarchical structure of a dataset is determined. The dataset includes a measure (e.g., sales, profits, quantities). Further the dataset includes a dimension (e.g., time) consisting of a plurality of levels (e.g., year, quarter, month) that form a dimension hierarchy.

In the method the visual plot is constructed based on a specification. Such specifications can range anywhere from simple indications of what the axes of the visual plot will represent to complex algebraic expressions that are described in more detail in Section 5.4 of copending U.S. patent application Ser. No. 10/453,834, entitled "Computer Systems and Methods for the Query and Visualization of Multidimensional Databases", filed Jun. 2, 2003.

Regardless, of the complexity of the specification, a first level from the plurality of levels of the dimension is represented by a first component of the visual plot and a second level from the plurality of levels is represented by a second component of the visual plot. For example, consider the case in which the dimension is time, the first level is months, the second level is years, the first component is the x-axis of the visual plot and the second component is the y-axis of the visual plot. In this example, the x-axis of the visual plot will represent months and the y-axis of the visual plot will represent years.

The method continues with a query of the dataset to retrieve data in accordance with the specification. The data retrieved from the dataset will include all or a portion of the dimension and all or a portion of the measure. For example, consider the case in which the dimension is time and the plurality of the levels of the time dimension in the dataset includes the levels years, quarters, and months. Further, the measure is sales. In such an example, sales data for all or a portion of the levels years, quarters, and months will be retrieved. In some embodiments, the dataset is a database 558 and the querying step comprises retrieving a set of tuples in accordance with the specification. Such techniques are described in further detail in steps 606 and 608 of Section 5.2, above.

In some embodiments, the dataset is a database, such as one of the databases 558 illustrated in FIG. 6. However, this aspect of the present disclosure is not limited to such databases. More generally, any dataset that includes a measure (e.g., sales, profits) and a dimension (e.g., time) that has a dimension hierarchy (e.g., year.quarter.month) can be used. Other examples of measures include, but are not limited to, business measurements like cash balances, cash flows, financial variance, units sold or customer response times, as well as scientific measurements like temperature or pressure. Examples of dimensions include, but are not limited to dates, product, markets segments, geographic regions, item identifiers like stock keeping units (SKUs), or the names of budgetary planning scenarios.

In the method, the visual plot is populated with the retrieved data in accordance with the specification. Exemplary methods by which the visual plot is populated with the retrieved data in accordance with the specification are discussed in steps 610 through 616 of Section 5.2, above, in conjunction with FIG. 7. However, this aspect of the present disclosure is not limited to the population schemes disclosed in Section 5.2 and illustrated in FIG. 7. In some embodiments, the visual plot comprises a plurality of panes and the populating step comprises associating all or a subset of the data (e.g., tuples) with a pane in the plurality of panes as described in further detail in step 616 of Section 5.2. In some embodiments, tuples are encoded a pane as a graphic as described in further detail in step 616 of Section 5.2.

In some embodiments, the specification that is used in this aspect of the present disclosure is a language based on the hierarchical structure of the dataset. For example, consider the case in which the dataset includes a time dimension with the level years, quarters and months. In such an example, the language used to construct the specification will include the expressions years, quarters and months as well as algebraic operators for combining such levels (e.g., cross operator, dot operator, etc.). Using the language, highly selective specifications can be used to construct the visual plot. More information on the use of language based on the hierarchical structure of a database 558 is disclosed in Section 5.2, above. The techniques disclosed in Section 5.2 can be used in this aspect of the present disclosure.

FIG. 19 illustrates a visual plot 1900 that illustrates the natural hierarchical display of levels of the time dimension (years, quarters, months) for sales data. In some embodiments, visual plot 1900 is generated as a visual table 720 using the systems and techniques described in Sections 5.1 through 5.3, above. In such embodiments, a visual specification is used to generate visual plot 1900. However, in other embodiments, visual plot 1900 is generated from data that was not obtained using the exemplary techniques discussed in Sections 5.1 through 5.3. For example, in some embodiments, visual plot 1900 is generated from spreadsheet data or a flat file. More generally, each of the graphics disclosed in this aspect of the present disclosure can be constructed using the exemplary techniques discussed in Sections 5.1 through 5.3, with a query of databases 558, or they can be generated from alternative sources of data. The only constraint on the data used by the graphics of the present disclosure is that it includes at least one dimension and at least one measure.

As disclosed above, the visual specifications in accordance with this aspect of the present disclosure (Section 5.4) includes a first component and a second component that respectively represent a first level and a second level in the dimension hierarchy of the underlying dataset (e.g., database 558). In some embodiments the first component and the second component are not the same and are each independently selected from the group consisting of a plurality of rows in the visual plot, a plurality of columns in the visual plot, a plurality of layers in the visual plot, an axis in the visual plot, a graphic in the visual plot, or a level of detail of a graphic in the visual plot. FIG. 20 illustrates the concept. In FIG. 20, the dimension in the dataset is time. Time appears on multiple axes of visual plot (both rows and columns) 2000. In visual plot 2000 the first component is columns and the second component is rows. Further, the first level is months and the second level is years. As such, the columns represent months and the rows represent years. Both the "years" level of the time dimension and the measure "sales" appear in the rows (y-axis) while the "quarters" and "months" levels of the time dimension appear on the x-axis, with the columns representing months.

In visual plot 2000, a first component (FIG. 20, y-axis) represents a first level (FIG. 20, years) of the dimension hierarchy and a measure (FIG. 20, sales) such that the measure is partitioned into a plurality of segments (FIG. 20, rows 2002) with each segment (FIG. 20, row 2002) in the plurality of segments representing a data point (FIG. 20, a respective year, e.g., 1998, 1999) in the first level. The second component (FIG. 20, x-axis) represents at least a second level (e.g., quarter and month) of the dimension hierarchy from the underlying dataset.

Visual plot 2000 allows for the analysis of the sales data illustrated in FIG. 19 in a very different manner. Visual plot 2000 (FIG. 20) has the format [Time].[Year]*[Sales] (rows, y-axis) versus [Time].[Quarter].[Month] (columns, x-axis). Therefore, each year generates a new row 2002 in the visual plot and each row represents sales for the corresponding year. Further, each row is delineated firstly by quarters and secondly by months. Thus, each bar in the visual plot represents sales in a given month for a given year. Advantageously, in visual plot 2000, sales for a respective month of the year (e.g., January) from multiple years (e.g., 1998 and 1999) are overlayed directly on top of each other in the same graphic. This allows, for example, the unique comparison of same month sales across multiple years. In some embodiments each row 2002 is assigned a different color or hash pattern.

As discussed previously, the visual plots in this aspect of the present disclosure are based on the specification. A first level from the plurality of levels is represented by a first component of the visual table and a second level from the plurality of levels is represented by a second component of the visual table. In some embodiments, the first component is a plurality of rows and the second component is a plurality of columns. In some embodiments, the first component is a plurality of rows and the second component is a plurality of layers. In other embodiments, the first component is a plurality of columns and the second component is a plurality of layers. Graphs that include multiple layers are illustrated in FIGS. 15 and 16. Generally speaking, layers are plotted in the z-dimension, with each layer spanning the x- and y-axis of the plot.

In some embodiments of the present disclosure, the graphics (e.g., bars) in each row in the table are assigned a different color or hash pattern. Thus, in one embodiment, the bars in row 2002-1 are colored blue and the bars in row 2002-2 are colored green. More generally, in some embodiments of the present disclosure the elements of the first and/or second components (e.g., bars, text) are assigned different colors and/or hash pattern.

FIG. 21 illustrates a visual plot 2100 in which a first component (segments 2106) represents a level of detail of a graphic (FIG. 21, bars 2102) and the second component (FIG. 21, months) is represented on a first axis (FIG. 21, the x-axis) of the visual plot while the second axis (y-axis) of the graph plot represents a measure (sales). The graphic (FIG. 21, bars 2102) is partitioned into a plurality of segments 2106 in accordance with the level of detail (FIG. 21, years) such that each segment 2106 of the plurality of segments is assigned a different color or a different hash pattern and each segment of the plurality of segments 2106 represents a different data point (FIG. 21, a different year) in the first level (FIG. 21 years) of the dimension hierarchy. As such, visual plot 2100 has the format [Sales] versus [Time].[Quarter].[Month] broken down by [Time].[Year]. That is, each bar 2102 in visual plot 2100 represents sales for a given month across multiple years. For example, bar 2102-1 represents sales made in January of the years 1998 and 1999. Furthermore, each bar 2102 is segmented by year. For example, a lower portion 2106 of bar 2102 represents the relative sales in January 1998 and is colored a first color or given a first hash pattern and an upper portion 2108 of bar 2102-1 represents relative sales in January 1999 and is colored a second color or given a second hash pattern. As such, level of time defines both an axis of the graphic and the level of detail of the graphic.

FIG. 22 illustrates an embodiment in which a set of levels from the dimension (FIG. 22, time) in the underlying dataset are represented by a first component (FIG. 22, columns) where the set of levels represent a portion of the dimension hierarchy of the dimension. In visual plot 2200 the set of levels represent the year.quarter.month levels of the time hierarchy. Further, as illustrated in FIG. 22, the set of levels do not include each level in the portion of the dimension hierarchy represented by the set of levels. In the case of FIG. 22, the set of levels are represented on the y-axis as columns. The set of levels on the y-axis include year and months, but not quarters. In other words, visual plot 2200 charts the measure "sales" (row, y-axis) versus the dimension "time" (columns, x-axis). However, in this embodiment, a level of the dimension time (year, quarter, month, day, minute) is skipped. Thus, although the underlying data has time delineated into the hierarchy year, quarter, and month, visual plot 2200 only displays the level "months" for the respective years 1998 and 1999. This is accomplished by selecting the year and month levels of the time dimension on shelf 708-5, which controls displacement of data on the x-axis (columns in FIG. 22), and the measure "sales" on shelf 708-4, which controls displacement of data on the y-axis of visual plot 2200.

FIG. 23 illustrates an embodiment in which the set of levels from the dimension hierarchy (e.g., FIG. 23, time) found in the underlying dataset is represented by the first component (FIG. 23 y-axis, columns) but in an order that deviates from an order in the dimension hierarchy. In particular, visual plot 2300 charts the measure SUM(gross_profit) (row) versus the dimension time (columns). However, in this embodiment, the levels of the dimension time are not displayed in their natural order. That is, year is nested within quarter. Thus, although the underlying data has time delineated into the hierarchy year, quarter, and month, visual plot 2300 displays the level "year" nested within "quarter". This is accomplished by selecting the quarter and year levels of the time dimension in reverse order on shelf 708-5, which controls displacement of data on the x-axis (columns in FIG. 23), and the measure "SUM(gross_profit)" on shelf 708-4, which controls displacement of data on the y-axis of visual plot 2300. Advantageously, visual plot 2300 provides a direct comparison of corresponding quarters from respective years. For example, in panel 2304, gross profits in the first quarter can be directly compared across the years 1997, 1998, 1999, 2000, 2001, and 2002.

The techniques of the present disclosure are not limited to bar charts. A wide variety of different marks can be used in the present disclosure. In some embodiments, a user selects which mark to use with toggle 2320 (FIG. 23). In visual plot 2300, the toggle is set to "bar" and, hence, a bar chart is depicted. However, in visual plot 2400 (FIG. 24), toggle 2320 is set to "text" resulting in the display of a text table. When toggle 2320 is set to "text", panel 2410 is used to specify what text is to be used in the graphic. Alternatively, in embodiments not shown, the user drags the text to be used directly onto the graphic. In FIG. 24, the text to be used is set to "sales." Thus, sales data for each month is displayed in text format along the x-axis of visual plot 2400. Further, because the level "year" of the dimension "time" is specified in shelf 708-5, the sales data along the x-axis is broken into rows along the y-axis, with each row representing a respective year of sales data.

Toggle 2320 can be set to a wide range of graphic types, including scatterplot matrices, as illustrated in visual plot 2500 (FIG. 25), where toggle 2320 is set to "square". In visual plot 2500, shelf 708-5 is set to the level "quarter" of the dimension time as well as the measure "sales". Therefore, the y-axis of visual plot 2500 depicts sales by quarter. Shelf 708-4 is set to the level "year" of the dimension time as well as the measure "profit". Accordingly, visual plot 2500 depicts a scatterplot of profit versus sales in respective quarters of respective years. Each data point in the scatterplot represents a given month and the coordinates of the data point are determined by the profits versus sales for the given month.

5.5 References Cited

All references cited herein are incorporated herein by reference in their entirety and for all purposes to the same extent as if each individual publication or patent or patent application was specifically and individually indicated to be incorporated by reference in its entirety for all purposes.

5.6 Alternative Embodiments

The present disclosure can be implemented as a computer program product that comprises a computer program mechanism embedded in a computer readable storage medium. For instance, the computer program product could contain the program modules shown in FIG. 6. These program modules may be stored on a CD-ROM, magnetic disk storage product, or any other computer readable data or program storage product. The software modules in the computer program product can also be distributed electronically, via the Internet or otherwise, by transmission of a computer data signal (in which the software modules are embedded) on a carrier wave.

Many modifications and variations of the present disclosure can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. A method for visualizing a multidimensional dataset, comprising:
    at a computing device having one or more processors and memory storing one or more programs configured for execution by the one or more processors:
    identifying a dimensional hierarchy associated with the multidimensional dataset, wherein the dimensional hierarchy includes at least a first dimension and a sub-dimension of the first dimension;
    displaying a graphical user interface window that includes a schema display region and a data visualization region that is distinct from the schema display region, wherein the schema display region includes a display of metadata for the plurality of dimensions and measures, including the first dimension and the sub-dimension;
    detecting user requests to associate the metadata identifying the first dimension with a first axis shelf in the data visualization region and to associate the metadata identifying the sub-dimension with a second axis shelf in the data visualization region;
    in response to the user requests,
      generating a plurality of panes for a visual table in the data visualization region, wherein each pane has a first axis corresponding to the first dimension associated with the first axis shelf and a second axis corresponding to the sub-dimension associated with the second axis shelf, and wherein the second axis is in a different direction from the first axis; and
      populating each pane in the visual table with a plurality of displayed marks, wherein each displayed mark corresponds to a respective tuple in the multidimensional dataset.

2. The method of claim 1, wherein the first axis is in horizontal direction and the second axis is in vertical direction.

3. The method of claim 1, wherein the first dimension and the sub-dimension are time dimensions, and wherein the first dimension is higher than the sub-dimension in a natural hierarchy of time.

4. The method of claim 1, wherein the first dimension and the sub-dimension are location dimensions, and wherein the first dimension is higher than the sub-dimension in a natural hierarchy of location.

5. The method of claim 1, wherein the first dimension and the sub-dimension are product dimensions, and wherein the first dimension is higher than the sub-dimension in a natural product hierarchy.

6. The method of claim 1, wherein the multidimensional dataset includes a plurality of data tuples, wherein each respective tuple in the plurality of tuples includes:
    (i) a first field corresponding to the first dimension; and
    (ii) a second field corresponding to the sub-dimension.

7. A computing system, comprising:
    one or more processors;
    memory; and
    one or more programs, wherein the one or more programs are stored in the memory and are configured to be executed by the one or more processors, the one or more programs including instructions which when executed cause the computing system to:
    identify a dimensional hierarchy associated with the multidimensional dataset, wherein the dimensional hierarchy includes at least a first dimension and a sub-dimension of the first dimension;
    display a graphical user interface window that includes a schema display region and a data visualization region that is distinct from the schema display region, wherein the schema display region includes a display of metadata for the plurality of dimensions and measures, including the first dimension and the sub-dimension;
    detect user requests to associate the metadata identifying the first dimension with a first axis shelf in the data visualization region and to associate the metadata identifying the sub-dimension with a second axis shelf in the data visualization region;
    in response to the user requests,
      generate a plurality of panes for a visual table in the data visualization region wherein each pane has a first axis corresponding to the first dimension associated with the first axis shelf and a second axis corresponding to the sub-dimension associated with the second axis shelf, and wherein the second axis is in a different direction from the first axis; and
      populate each pane in the visual table with a plurality of displayed marks, wherein each displayed mark corresponds to a respective tuple in the multidimensional dataset.

8. The system of claim 7, wherein the first axis is in horizontal direction and the second axis is in vertical direction.

9. The system of claim 7, wherein the first dimension and the sub-dimension are time dimensions, and wherein the first dimension is higher than the sub-dimension in a natural hierarchy of time.

10. The system of claim 7, wherein the first dimension and the sub-dimension are location dimensions, and wherein the first dimension is higher than the sub-dimension in a natural hierarchy of location.

11. The system of claim 8, wherein the first dimension and the sub-dimension are product dimensions, and wherein the first dimension is higher than the sub-dimension in a natural product hierarchy.

12. The system of claim 7, wherein the multidimensional dataset includes a plurality of data tuples, wherein each respective tuple in the plurality of tuples includes:
    (i) a first field corresponding to the first dimension; and
    (ii) a second field corresponding to the sub-dimension.

13. A non-transitory computer readable storage medium having one or more computer programs embedded therein, the one or more computer programs comprising instructions, which when executed by a computing system, cause the computing system to:

identify a dimensional hierarchy associated with the multidimensional dataset, wherein the dimensional hierarchy includes at least a first dimension and a sub-dimension of the first dimension;

display a graphical user interface window that includes a schema display region and a data visualization region that is distinct from the schema display region, wherein the schema display region includes a display of metadata for the plurality of dimensions and measures, including the first dimension and the sub-dimension;

detect user requests to associate the metadata identifying the first dimension with a first axis shelf in the data visualization region and to associate the metadata identifying the sub-dimension with a second axis shelf in the data visualization region;

in response to the user requests, generate a plurality of panes for a visual table in the data visualization region, wherein each pane has a first axis corresponding to the first dimension associated with the first axis shelf and a second axis corresponding to the sub-dimension associated with the second axis shelf, and wherein the second axis is in a different direction from the first axis; and populate each pane in the visual table with a plurality of displayed marks, wherein each displayed mark corresponds to a respective tuple in the multidimensional dataset.

14. The non-transitory computer readable storage medium of claim 13, wherein the first axis is in horizontal direction and the second axis is in vertical direction.

15. The non-transitory computer readable storage medium of claim 13, wherein the first dimension and the sub-dimension are time dimensions, and wherein the first dimension is higher than the sub-dimension in a natural hierarchy of time.

16. The non-transitory computer readable storage medium of claim 13, the first dimension and the sub-dimension are location dimensions, and wherein the first dimension is higher than the sub-dimension in a natural hierarchy of location.

17. The non-transitory computer readable storage medium of claim 13, wherein the first dimension and the sub-dimension are product dimensions, and wherein the first dimension is higher than the sub-dimension in a natural product hierarchy.

18. The non-transitory computer readable storage medium of claim 13, wherein the multidimensional dataset includes a plurality of data tuples, wherein each respective tuple in the plurality of tuples includes:

(i) a first field corresponding to the first dimension; and
    (ii) a second field corresponding to the sub-dimension.

\* \* \* \* \*